United States Patent
Kumano et al.

(10) Patent No.: US 12,091,004 B2
(45) Date of Patent: Sep. 17, 2024

(54) TRAVEL LANE ESTIMATION DEVICE, TRAVEL LANE ESTIMATION METHOD, AND COMPUTER-READABLE NON-TRANSITORY STORAGE MEDIUM

(71) Applicant: DENSO CORPORATION, Kariya (JP)

(72) Inventors: Shunya Kumano, Nisshin (JP); Takeshi Shikimachi, Kariya (JP); Hiroki Ukai, Kariya (JP)

(73) Assignee: DENSO CORPORATION, Kariya (JP)

( * ) Notice: Subject to any disclaimer, the term of this patent is extended or adjusted under 35 U.S.C. 154(b) by 509 days.

(21) Appl. No.: 17/370,720

(22) Filed: Jul. 8, 2021

(65) Prior Publication Data
US 2021/0331671 A1   Oct. 28, 2021

Related U.S. Application Data

(63) Continuation of application No. PCT/JP2019/049546, filed on Dec. 18, 2019.

(30) Foreign Application Priority Data

Jan. 10, 2019 (JP) ................................ 2019-002929

(51) Int. Cl.
*B60W 30/12* (2020.01)
*B60W 40/02* (2006.01)
(Continued)

(52) U.S. Cl.
CPC ............ *B60W 30/12* (2013.01); *B60W 40/02* (2013.01); *G01S 7/292* (2013.01); *G01S 17/42* (2013.01);
(Continued)

(58) Field of Classification Search
CPC .. B60W 30/12; B60W 40/02; B60W 2552/53; B60W 2554/4041;
(Continued)

(56) References Cited

U.S. PATENT DOCUMENTS

| | | | |
|---|---|---|---|
| 2010/0246889 A1 | 9/2010 | Nara et al. | |
| 2014/0088862 A1* | 3/2014 | Simon | G01C 21/3602 |
| | | | 701/446 |
| 2017/0059713 A1* | 3/2017 | Heo | G06V 10/50 |

FOREIGN PATENT DOCUMENTS

JP          2004-341941 A1     12/2004

* cited by examiner

*Primary Examiner* — Vivek D Koppikar
*Assistant Examiner* — Godfrey Aleksander Maciorowski
(74) *Attorney, Agent, or Firm* — MASCHOFF BRENNAN

(57) ABSTRACT

The position of the distance measurement point is acquired from the distance measurement sensor, the lateral position of the road boundary is estimated from the most frequent value in the frequency distribution indicating the distribution status of the distance measurement point group. When multiple peaks having a frequency in the frequency distribution equal to or higher than a predetermined value are disposed on one of the left side and the right side of the vehicle, it is determined whether the estimation of the road boundary is in an unstable state. The vehicle position on the map is specified, and the traveling lane of the vehicle is estimated based on the information about the numerical number of traffic lanes and the positional relationship of the road boundary without using the estimation result of the lateral position of the road boundary in the unstable state.

8 Claims, 11 Drawing Sheets

(51) Int. Cl.
*G01S 7/292* (2006.01)
*G01S 17/42* (2006.01)
*G01S 17/89* (2020.01)
*G01S 17/931* (2020.01)
*G06V 20/56* (2022.01)
*G06V 20/58* (2022.01)

(52) U.S. Cl.
CPC ............ *G01S 17/89* (2013.01); *G01S 17/931* (2020.01); *G06V 20/58* (2022.01); *G06V 20/588* (2022.01); *B60W 2552/53* (2020.02); *B60W 2554/4041* (2020.02); *B60W 2556/40* (2020.02)

(58) Field of Classification Search
CPC .... B60W 2556/40; G01S 7/292; G01S 17/42; G01S 17/89; G01S 17/931; G01S 7/4802; G06V 20/58; G06V 20/588; G01C 21/30; G08G 1/16
See application file for complete search history.

TRAVEL LANE ESTIMATION DEVICE, TRAVEL LANE ESTIMATION METHOD, AND COMPUTER-READABLE NON-TRANSITORY STORAGE MEDIUM

CROSS REFERENCE TO RELATED APPLICATION

The present application is a continuation application of International Patent Application No. PCT/JP2019/049546 filed on Dec. 18, 2019, which designated the U.S. and claims the benefit of priority from Japanese Patent Application No. 2019-002929 filed on Jan. 10, 2019. The entire disclosures of all of the above applications are incorporated herein by reference.

TECHNICAL FIELD

The present disclosure relates to a travel lane estimation device, a travel lane estimation method, and a computer-readable non-transitory storage medium for estimating a travel lane of an own vehicle.

BACKGROUND

In a conceivable technique, a technique is disclosed for estimating the driving lane of a vehicle with the image recognition processing unit that inputs the image of the rear camera by extracting the white line that divides the current driving lane of the own vehicle while driving on the highway and by recognizing the type of the white line. Further, in a conceivable technique, a technique is disclosed for estimating the current driving lane of the subject vehicle even at the branch portion by using whether or not the own vehicle crosses the white line, the type of the crossed white line, and the branch type included in the map data. Further, in a conceivable technique, a technique is disclosed for estimating the type of the white line on the left or right side of the current white line based on the white line type information stored in the past as the travelling history data when the white line type is unknown assuming that the types of white lines on the left and right sides do not change from the past white line types unless the own vehicle changes a lane.

SUMMARY

According to an example embodiment, the position of the distance measurement point is acquired from the distance measurement sensor, the lateral position of the road boundary is estimated from the most frequent value in the frequency distribution indicating the distribution status of the distance measurement point group. When multiple peaks having a frequency in the frequency distribution equal to or higher than a predetermined value are disposed on one of the left side and the right side of the vehicle, it is determined whether the estimation of the road boundary is in an unstable state. The vehicle position on the map is specified, and the traveling lane of the vehicle is estimated based on the information about the numerical number of traffic lanes and the positional relationship of the road boundary without using the estimation result of the lateral position of the road boundary in the unstable state.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
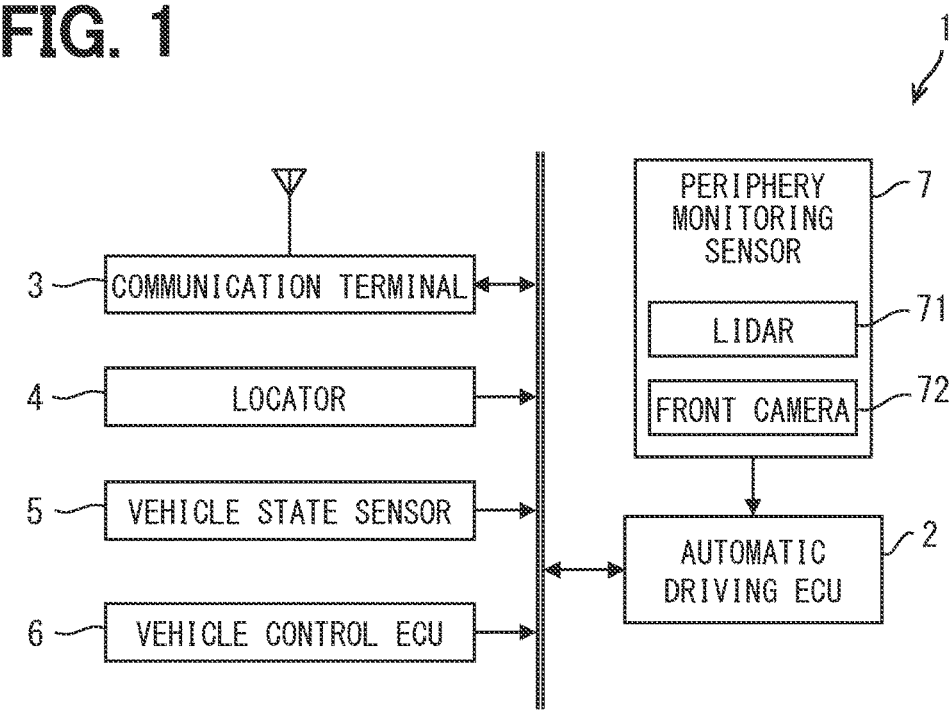
FIG. 1 is a diagram illustrating one example of a schematic configuration of a drive assist system.

In the conceivable technique, when the white line type is not clear, the type of the current white line on the right or left side is estimated based on the past white line type information stored as the traveling history data. However, since the white lines are not continuous in sections where the number of traffic lanes increases or decreases such as a branch portion, it is difficult to estimate the type of the current white line on the right or left side based on the past white line type information. Therefore, with the technique disclosed in the conceivable technique, it is difficult to accurately estimate the traveling lane of the own vehicle when there is no white line or the type of the white line cannot be recognized.

One example of the present embodiments provides a travel lane estimation device, a travel lane estimation method, a control program, a computer-readable non-transitory storage medium that are capable of more accurately estimating the travel lane of the subject vehicle even in a section where it is difficult to recognize a line type of a travel lane based on an image recognition process of a camera image.

In one example of the present embodiments, the travel lane estimation device used in a vehicle includes: a distance measurement point acquisition unit that acquires the position of the distance measurement point which is disposed on the surface of the object reflecting the exploration wave and is detected by the distance measurement sensor that detects the position of the distance measurement point with respect to the vehicle by transmitting the exploration wave around the vehicle and receiving the reflected wave of the exploration wave reflected by the object; a road boundary estimation unit that estimates a lateral position of a road boundary to be positions in the right-left direction of the vehicle shown by the most frequent values on both a right side and a left side of the vehicle as a center in the frequency distribution indicative of the distribution status for each position in the right-left direction of the vehicle among the distance measurement point group as a group of the distance measurement points sequentially acquired by the distance measurement point acquisition unit; a stability determination unit that determines whether the lateral position of the road boundary is estimated by the road boundary estimation unit in the unstable state, based on the information about the peaks that have the frequency in the frequency distribution equal to or larger than the predetermined value when multiple peaks are disposed on one side of both the right side and the left side of the vehicle as the center; a map data acquisition unit that acquires the map data including the information about the number of traffic lanes; a vehicle position specifying unit that specifies the position of the vehicle on the map using the map data acquired by the map data acquisition unit; and a driving lane estimation unit that estimates the driving lane of the vehicle using the information about the number of traffic lanes corresponding to the position of the vehicle specified by the vehicle position specifying unit and included in the map data acquired by the map data acquisition unit and the positional relationship of the lateral position of the road boundary estimated by the road boundary estimation unit with respect to the position of the vehicle. The driving lane estimation unit estimates the driving lane of the vehicle without using the estimation result of the lateral position of the road boundary estimated by the road boundary estimation unit, which is determined to be an unstable state by the stability determination unit.

In one example of the present embodiments, the travel lane estimation method used in a vehicle includes: acquiring the position of the distance measurement point which is disposed on the surface of the object reflecting the exploration wave and is detected by the distance measurement sensor that detects the position of the distance measurement point with respect to the vehicle by transmitting the exploration wave around the vehicle and receiving the reflected wave of the exploration wave reflected by the object; estimating a lateral position of a road boundary to be positions in the right-left direction of the vehicle shown by the most frequent values on both a right side and a left side of the vehicle as a center in the frequency distribution indicative of the distribution status for each position in the right-left direction of the vehicle among the distance measurement point group as a group of the distance measurement points sequentially acquired; determining whether the lateral position of the road boundary is estimated in the unstable state, based on the information about the peaks that have the frequency in the frequency distribution equal to or larger than the predetermined value when multiple peaks are disposed on one side of both the right side and the left side of the vehicle as the center; acquiring the map data including the information about the number of traffic lanes; specifying the position of the vehicle on the map using the map data acquired; and estimating the driving lane of the vehicle using the information about the number of traffic lanes corresponding to the position of the vehicle specified and included in the map data acquired and the positional relationship of the lateral position of the road boundary estimated with respect to the position of the vehicle. The driving lane of the vehicle is estimated without using the estimation result of the lateral position of the road boundary estimated, the estimation of which is determined to be an unstable state.

In one example of the present embodiments, the control program causes the computer to function as: a distance measurement point acquisition unit that acquires the position of the distance measurement point which is disposed on the surface of the object reflecting the exploration wave and is detected by the distance measurement sensor that detects the position of the distance measurement point with respect to the vehicle by transmitting the exploration wave around the vehicle and receiving the reflected wave of the exploration wave reflected by the object; a road boundary estimation unit that estimates a lateral position of a road boundary to be positions in the right-left direction of the vehicle shown by the most frequent values on both a right side and a left side of the vehicle as a center in the frequency distribution indicative of the distribution status for each position in the right-left direction of the vehicle among the distance measurement point group as a group of the distance measurement points sequentially acquired by the distance measurement point acquisition unit; a stability determination unit that determines whether the lateral position of the road boundary is estimated by the road boundary estimation unit in the unstable state, based on the information about the peaks that have the frequency in the frequency distribution equal to or larger than the predetermined value when multiple peaks are disposed on one side of both the right side and the left side of the vehicle as the center; a map data acquisition unit that acquires the map data including the information about the number of traffic lanes; a vehicle position specifying unit that specifies the position of the vehicle on the map using the map data acquired by the map data acquisition unit; and a driving lane estimation unit that estimates the driving lane of the vehicle using the information about the number of traffic lanes corresponding to the position of the vehicle specified by the vehicle position specifying unit and included in the map data acquired by the map data acquisition unit and the positional relationship of the lateral position of the road boundary estimated by the road boundary estimation unit with respect to the position of the vehicle. Further, the driving lane estimation unit estimates the driving lane of the vehicle without using the estimation result of the lateral position of the road boundary estimated by the road boundary estimation unit, which is determined to be an unstable state by the stability determination unit.

In one example of the present embodiments, the computer-readable non-transitory storage medium includes instructions executed by the computer. The instructions includes: acquiring the position of the distance measurement point which is disposed on the surface of the object reflecting the exploration wave and is detected by the distance measurement sensor that detects the position of the distance measurement point with respect to the vehicle by transmitting the exploration wave around the vehicle and receiving the reflected wave of the exploration wave reflected by the object; estimating a lateral position of a road boundary to be positions in the right-left direction of the vehicle shown by the most frequent values on both a right side and a left side of the vehicle as a center in the frequency distribution indicative of the distribution status for each position in the right-left direction of the vehicle among the distance measurement point group as a group of the distance measurement points sequentially acquired; determining whether the lateral position of the road boundary is estimated in the unstable state, based on the information about the peaks that have the frequency in the frequency distribution equal to or larger than the predetermined value when multiple peaks are disposed on one side of both the right side and the left side of the vehicle as the center; acquiring the map data including the information about the number of traffic lanes; specifying the position of the vehicle on the map using the map data acquired; and estimating the driving lane of the vehicle using the information about the number of traffic lanes corresponding to the position of the vehicle specified and included in the map data acquired and the positional relationship of the lateral position of the road boundary estimated with respect to the position of the vehicle. The driving lane of the vehicle is estimated without using the estimation result of the lateral position of the road boundary estimated, the estimation of which is determined to be an unstable state.

By transmitting an exploration wave around the vehicle and receiving the reflected wave of the exploration wave reflected by the object, the position of the distance measurement point on the surface of the object, at which the exploration wave is reflected, is detected with respect to the vehicle by the distance measurement sensor, and the distance measurement point includes these for a vehicle on the road and these for a structure that defines the road boundary. The frequency distribution of the distance measurement point group, which is a group of the distance measurement points, indicates the distribution status for each position in the right-left direction of the vehicle, and the frequency distribution is likely to show the most frequent value at the position of the road boundary. This is because the structure that defines the road boundary is likely to continue to exist in a certain lateral position with respect to the lane, so the distribution status of the distance measurement point group by for each position in the right-left direction of the vehicle is more likely to be unevenly disposed at the position of the road boundary. Therefore, from the most frequent value in the frequency distribution showing the distribution status of the distance measurement point group for each position in the right-left direction of the vehicle, the position in the right-left direction of the vehicle indicated by the most frequent value is estimated as the lateral position of the road boundary, so that this makes it possible to estimate the lateral position of the road boundary more accurately.

In addition, when there are a plurality of peaks in the frequency distribution in which the frequency is equal to or higher than a predetermined value on one of the left and right sides of the vehicle as the center, the frequency distribution indicating the distribution status for each position of the vehicle in the right-left direction may not indicate the most frequent value the position of the road boundary. On the other hand, when the information about the peak whose frequency is equal to or higher than the predetermined value in the frequency distribution is used, it is possible to determine whether or not the estimation of the lateral position of the road boundary is unstable, and further, it is possible to determine whether the possibility of showing the most frequent value at the position of the road boundary by deciding whether or not multiple peaks are balanced.

By using the lane number information corresponding to the vehicle position and the positional relationship of the estimated lateral position of the road boundary with respect to the vehicle position, it is possible to specify whether or not there are other lanes on the left and right of the own vehicle. Therefore, it is possible to estimate which of the plurality of existing lanes the vehicle is traveling in. Furthermore, since the lateral position of the road boundary estimated as described above based on the distance measurement points detected by the distance measurement sensor is used for estimating the traveling lane of the own vehicle, it is possible to estimate the driving lane of the own vehicle even in a section where it is difficult to recognize the type of the traveling lane line from the image recognition process of the camera image. Furthermore, since the estimation result of the lateral position determined to be in an unstable state is not used for the estimation of the traveling lane, it is possible to suppress the reduction of the estimation accuracy of the traveling lane of the own vehicle using the estimation result of the unstable lateral position. As the result, even in the section where it is difficult to recognize the traveling lane marking type based on the image recognition process of the camera image, it may be possible to more accurately estimate the traveling lane of the subject vehicle.

The following will describe embodiments of the present disclosure with reference to the accompanying drawings. For convenience of description, the same reference symbols are assigned to portions having the same functions as those illustrated in the drawings used in the description of embodiments, and a description of the same portion may be omitted. The description of other embodiments may be referred to with respect to these portions given the same reference symbols.

First Embodiment

<Overview of the Configuration of the Drive Assist System 1>

Hereinafter, a first embodiment of the present disclosure will be described with reference to the drawings. A driving assist system 1 shown in FIG. 1 is used for a vehicle such as an automobile, and includes an automatic driving ECU 2, a communication terminal 3, a locator 4, a vehicle state sensor 5, a vehicle control ECU 6, and a periphery monitoring sensor 7. The automatic driving ECU 2, the communication terminal 3, the locator 4, the vehicle state sensor 5, and the vehicle control ECU 6 are connected to, for example, an in-vehicle LAN. Hereinafter, a vehicle using the driving assist system 1 is referred to as a subject vehicle.

The communication terminal 3 communicates with a server that distributes map data via a public communication network, and receives the map data distributed from this server. The map data is link data, node data, or the like. The link data includes various pieces of data such as an link ID identifying a link, a link length indicating a length of the link, a link azimuth, a link travel time, link shape information (hereinafter, link shape), node coordinates (latitude/longitude) of a start point and an end point of the link, and road attributes. As one example, the link shape may include a coordinate sequence representing coordinate positions of shape interpolation points representing a shape formed of both ends of the link and a position between the both ends. The road attributes include a road name, a road type, a road width, lane number information indicating the number of lanes, a speed regulation value, and the like. The node data includes a various pieces of data such as a node ID in which a unique number is assigned to each node on a map, node coordinates, a node name, a node type, a connection link ID in which a link ID of a link connected to the node is described, and the like. The lane number information may be configured to be, for example, for each up/down link direction. That is, the lane number information may be information indicating the number of lanes on each side.

The link data may be configured for each road section. However, in the present embodiment, an example in which the link data is configured for each lane and subdivided as compared with the link data for each road section will be described. That is, even in the same road section, when there are multiple lanes (traveling lanes), the link data exists for each of the multiple lanes. When the link data is configured for each lane, the lane number information may include a lane number indicating which lane is among multiple lanes, or the like.

The locator 4 includes a GNSS (Global Navigation Satellite System) receiver and an inertial sensor. The GNSS receiver receives positioning signals from multiple positioning satellites. The inertial sensor includes a gyro sensor and an acceleration sensor, for example. The locator 4 combines the positioning signals received by the GNSS receiver with the measurement results of the inertial sensors to sequentially detect the vehicle position (hereinafter, subject vehicle position) of the subject vehicle on which the locator 4 is mounted. The subject vehicle position may be represented by, for example, coordinates of latitude and longitude. The subject vehicle position may be measured using a travel distance obtained from signals sequentially output from a vehicle speed sensor mounted on the subject vehicle.

The vehicle state sensor 5 is a sensor group for detecting each state of the subject vehicle, and includes a behavior sensor that detects a physical state amount related to a subject vehicle behavior and an operation state sensor for detecting a subject vehicle operation state. The behavior sensor includes a vehicle sensor that detects a vehicle speed of the subject vehicle, a steering sensor that detects a steering angle of the subject vehicle, and a yaw rate sensor that detects a yaw rate of the subject vehicle, or the like. As the sensor that detects the yaw rate, the inertial sensor of the locator 4 may be used. The operation state sensor includes, an accelerator position sensor that detects an opening degree of an accelerator pedal of the subject vehicle, a brake pedaling force sensor that detects the pedaling amount of a brake pedal of the subject vehicle, or the like. The vehicle state sensor 5 outputs detected sensing information to the in-vehicle LAN. Note that the sensing information detected by the vehicle state sensor 5 may be output to the in-vehicle LAN via the ECU mounted on the subject vehicle.

The vehicle control ECU 6 is an electronic control device that performs acceleration and deceleration control and/or steering control of the subject vehicle. The vehicle control ECU 6 includes a steering ECU that performs steering control, a power unit control ECU and a brake ECU that perform acceleration/deceleration control, and the like. The vehicle control ECU 6 acquires detection signals output from respective sensors such as the accelerator position sensor, the brake pedal force sensor, the steering angle sensor, the vehicle speed sensor, and the like mounted on the subject vehicle, and outputs a control signal to an electronic control throttle, a brake actuator, an EPS (Electronic Power Steering) motor, and the like. Further, the vehicle control ECU 6 is capable of outputting the sensing information of each of the above sensors to the in-vehicle LAN.

The periphery monitoring sensor 7 is an autonomous sensor that monitors the peripheral environment of the subject vehicle. As one example, the periphery monitoring sensor 7 is used for recognizing moving dynamic targets such as pedestrians, animals other than human, and vehicles other than the subject vehicle and stationary static targets such as guardrails, curbs, and trees. In addition, the periphery monitoring sensor 7 is used for recognizing road markings such traffic lane markings in peripheral of the subject vehicle.

As the periphery monitoring sensor 7, a distance measuring sensor such as a millimeter wave radar, a sonar, a LiDAR (Light Detection and Ranging/Laser Imaging Detection and Ranging), or the like may be employed. The distance measuring sensor transmits the exploration wave to the periphery of the own vehicle and receives the reflected wave of the exploration wave reflected by the object, so that the distance measuring sensor detects a position of the distance measurement point on the surface of the object that reflects the exploration wave. Then, the detection result is sequentially output to the in-vehicle LAN as sensing information. More specifically, the distance measuring sensor measures the distance from the distance measuring sensor to the distance measurement point based on the time taken from transmitting the exploration wave to receiving the reflected wave reflected at the distance measuring point on the surface of the object. Further, the distance measuring sensor measures the direction of the distance measurement point with respect to the distance measuring sensor from the transmission angle of the exploration wave when receiving the reflected wave, for example, by scanning the exploration wave. Then, the position of the distance measurement point with respect to the own vehicle is detected from the distance to the distance measurement point and the direction of the distance measurement point.

Further, as the peripheral monitoring sensor 7, there is a peripheral monitoring camera. The peripheral monitoring camera captures a predetermined range around the vehicle. The periphery monitoring camera sequentially outputs the captured images to be sequentially captured as sensing information to the in-vehicle LAN.

In the present embodiment, hereinafter, an example of using, as the periphery monitoring sensor 7, a front camera 72 of which capture range is a predetermined range in front of the subject vehicle and a LIDAR 71 of which measurement range is a predetermined range in front of the subject vehicle, will be described.

The LIDAR 71 is a device that irradiates laser light in a plurality of directions and detects the position of each reflection point based on the direction and time when the reflected light is received. In the present embodiment, the LIDAR 71 detects a two-dimensional position for each distance measurement point by scanning the laser beam in the horizontal direction. As an example, the position information for each distance measurement point may be represented by, for example, a two-dimensional orthogonal coordinate system having the position of LIDAR 71 as the origin. The X-axis of this two-dimensional orthogonal coordinate system is the axis in the width direction of the own vehicle, and the Y-axis is the axis in the front-rear direction of the own vehicle. The LIDAR 71 may be configured to detect a three-dimensional position for each distance measurement point by scanning the laser beams of a plurality of lines arranged in the vertical direction along the horizontal direction, but in view of simplification of the description, the case of detecting the above-mentioned two-dimensional position will be described as an example.

The vertical direction and the horizontal direction here are the vertical direction and the horizontal direction for the LIDAR 71, and are set in advance with respect to the LIDAR 71. The LIDAR 71 is installed in a posture in which the vertical direction is parallel to the height direction of the own vehicle and the horizontal direction is parallel to the horizontal plane of the own vehicle. The horizontal plane of the own vehicle is a plane perpendicular to the height direction of the own vehicle. The angle range in which the laser beam is irradiated in the vertical direction corresponds to the detection range of the LIDAR 71 in the vertical direction. Further, the angle range in which the laser beam is irradiated in the horizontal direction corresponds to the detection range of the LIDAR 71 in the horizontal direction. The irradiation range of the laser beam in each of the vertical direction and the horizontal direction defines the viewing angle (that is, the detection range) of the LIDAR 71. In the present embodiment, the following description will be made assuming that the detection range of the LIDAR 71 in the horizontal direction is the detection range of the LIDAR 71.

The irradiation directions of a large number of laser beams constituting the detection range are specified by horizontal angles. The number of laser beam irradiations in the horizontal direction (hereinafter referred to as the number of directions) may be appropriately designed. When the detection range of the LIDAR 71 is constant, the larger the number of directions, the higher the resolution.

The LIDAR 71 operates in a predetermined detection cycle (for example, every 100 milliseconds) to sequentially generate the distance measurement point group data for a group of the distance measurement points within the detection range. The distance measurement point group data may show the position information for each distance measurement point in the distance measurement point group. The distance measurement point group data generated by the LIDAR 71 is output to the automatic driving ECU 2. That is, for each detection cycle, the distance measurement point group data for the group of distance measurement points within the detection range is output to the automatic driving ECU 2.

In the present embodiment, the LIDAR 71 is a scan-type LIDAR that forms a desired detection range by sweeping and irradiating a laser beam, but may not be limited to this feature. The LIDAR 71 may be a flash type LIDAR that irradiates a wide range of laser light, images the laser light reflected by an object around the vehicle with a three-dimensional distance image sensor, and analyzes it with a predetermined algorithm to generate the distance measurement point group data. Alternatively, the laser light may be realized by using infrared rays.

The automatic driving ECU 2 includes, for example, a processor, a memory, an I/O, and a bus that connects those devices, and executes various processes related to the automatic driving by executing a control program stored in the memory. The various processes related to the automatic driving include a process (hereinafter, traveling lane estimation process) of estimating the traveling lane of the subject vehicle. The memory mentioned in the above is a non-transitory tangible storage medium that non-temporarily stores computer-readable program and data. The non-transitory tangible storage medium is embodied by a semiconductor memory or a magnetic disk. This automatic driving ECU 2 corresponds to an in-vehicle device. The details of the automatic driving ECU 2 will be described below.

<Schematic Configuration of Automatic Driving ECU 2>

Figure 2:
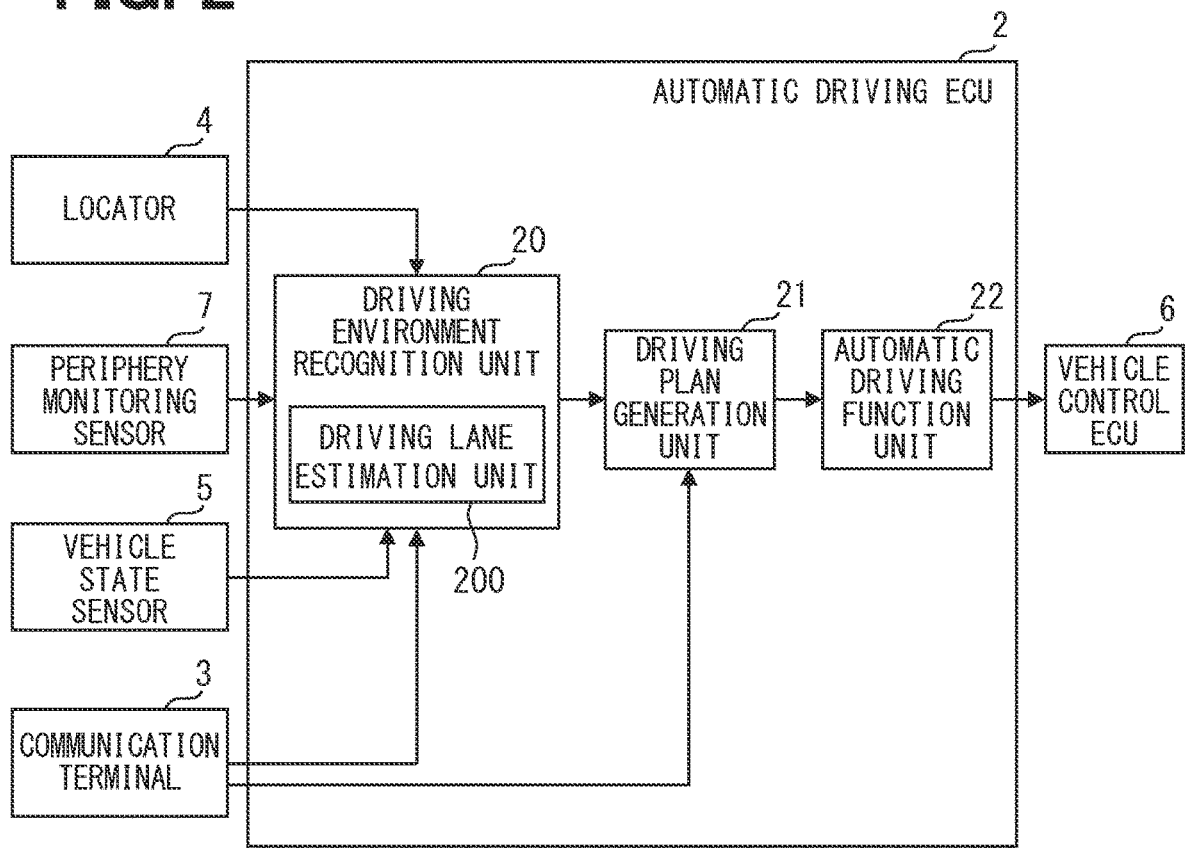
FIG. 2 is a diagram illustrating an example of a schematic configuration of an automatic driving ECU.

Subsequently, a schematic configuration of the automatic driving ECU 2 will be described with reference to FIG. 2. As shown in FIG. 2, the automatic driving ECU 2 includes a traveling environment recognition unit 20, a schedule generation unit 21, and an automatic driving function unit 22 as functional blocks.

The traveling environment recognition unit 20 recognizes a traveling environment of the subject vehicle based on the map data acquired from the communication terminal 3, the subject vehicle position acquired from the locator 4, the sensing information acquired from the periphery monitoring sensor 7, the sensing information acquired from the vehicle state sensor 5, or the like. AS one example, with use of these information, the traveling environment recognition unit 20 recognizes a position of an object in peripheral of the subject vehicle, a shape, and a movement state, and generates a virtual space in which the actual traveling environment is reproduced. When recognizing the traveling environment of the subject vehicle, a subject vehicle lane estimation unit 200 in the traveling environment recognition unit 20 executes a traveling lane estimation process of estimating the traveling lane in which the subject vehicle is traveling. This subject vehicle lane estimation unit 200 corresponds to a traveling lane estimation apparatus. Execution of the control program by a processor for the traveling lane estimation process corresponds to execution of a traveling lane estimation method corresponding to the control program.

In a case where the traveling lane markings can be recognized based on the sensing information acquired form the periphery monitoring sensor 7, the subject vehicle lane estimation unit 200 estimates the traveling lane of the subject vehicle based on the number of traveling lane markings to be recognized or the subject vehicle positions with respect to these traveling lane markings.

The case where the traveling lane markings can be recognized based on the sensing information acquired form the periphery monitoring sensor 7 includes a case where the traveling lane markings or, the traveling lane markings and the types can be recognized by executing an image recognition process on the capture image of the front camera 72. A process in a case where the traveling lane markings can not be recognized based on the sensing information acquired form the periphery monitoring sensor 7 will be described later.

The schedule generation unit 21 uses the traveling environment recognized by the traveling environment recognition unit 20, and generates the traveling schedule for causing the subject vehicle to travel with the automatic driving. For example, in a medium- and long-term traveling schedule, the schedule generation unit 21 executes a route search process and generates a recommendation route for causing the vehicle to go from the subject vehicle position to a destination. In a short-term traveling schedule for performing travel along the medium- and long-term traveling schedule, steering for changing the lane, acceleration and deceleration for adjusting the speed, execution of steering, braking, and the like for avoiding obstacles are determined.

The automatic driving function unit 22 causes the vehicle control ECU 6 to automatically accelerate, brake, or steer the subject vehicle according to the traveling schedule output from the schedule generation unit 21, thereby replacing the driving operation of the driver. The replacement of the driving operation is referred to as automatic driving.

<Outline Configuration of Driving Lane Estimation Unit 200>

Figure 3:
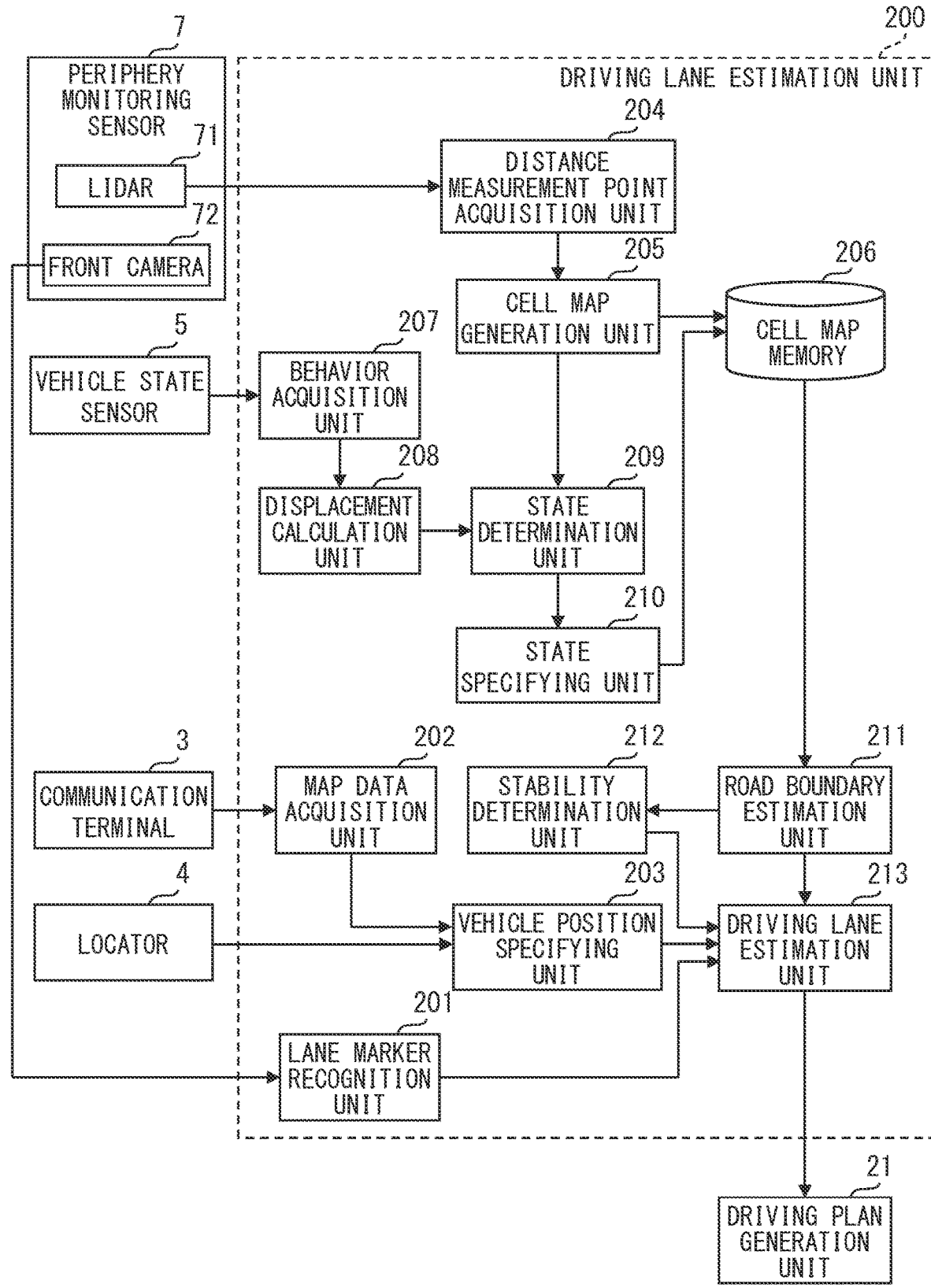
FIG. 3 is a diagram showing one example of a schematic configuration of a subject vehicle lane estimation unit.

Here, a schematic configuration of the subject vehicle lane estimation unit 200 will be described with reference to FIG. 3. As shown in FIG. 3, the driving lane estimation unit 200 includes a lane marking recognition unit 201, a map data acquisition unit 202, a vehicle position specifying unit 203, a distance measurement point acquisition unit 204, a cell map generation unit 205, and a cell map storage unit 206, a behavior acquisition unit 207, a displacement amount calculation unit 208, a state determination unit 209, a state specifying unit 210, a road boundary estimation unit 211, a stability determination unit 212, and a driving lane estimation unit 213 provided as functional blocks.

The lane marking recognition unit 201 recognizes the traveling lane marking or, the traveling lane marking and the type thereof by executing edge detection on the capture image sequentially output from the front camera 72 and executing the image recognition process such as pattern recognition. The lane marking recognition unit 201 may recognize the traveling lane marking or, the traveling lane marking and the type by the image recognition process using a machine learning.

The map data acquisition unit 202 acquires the map data received by the communication terminal 3. In the present embodiment, the communication terminal 3 receives the map data from the server outside the subject vehicle. However, it is not necessarily limited to this. For example, the map data may be stored in a non-volatile memory mounted on the subject vehicle, and the map data acquisition unit 202 may acquire the map data from this non-volatile memory.

The subject vehicle position specifying unit 203 identifies the subject vehicle position on the map based on the subject vehicle portion acquired from the locator 4 and the map data acquired by the map data acquisition unit 202. As one example, the subject vehicle position on the road is matched by a map matching process, and thereby the subject vehicle position on the map is identified. The subject vehicle position specifying unit 203 may identify a link direction based on an advancing direction identified from the subject vehicle position sequentially acquired from the locator 4, and match the subject vehicle position on the road. In a case of a road having multiple lanes on each side, for example, the subject vehicle position specifying unit 203 may temporarily identify the traveling lane based on a determination of a link closest to the subject vehicle position acquired from the locator 4 or the like, and may match the traveling lane on the road.

The distance measurement point acquisition unit 204 acquires the position of the distance measurement point detected by the LIDAR 71. As an example, the distance measurement point acquisition unit 204 sequentially acquires the distance measurement point group data for the group of distance measurement points within the detection range, which is detected for each detection cycle of LIDAR 71.

Figure 4:
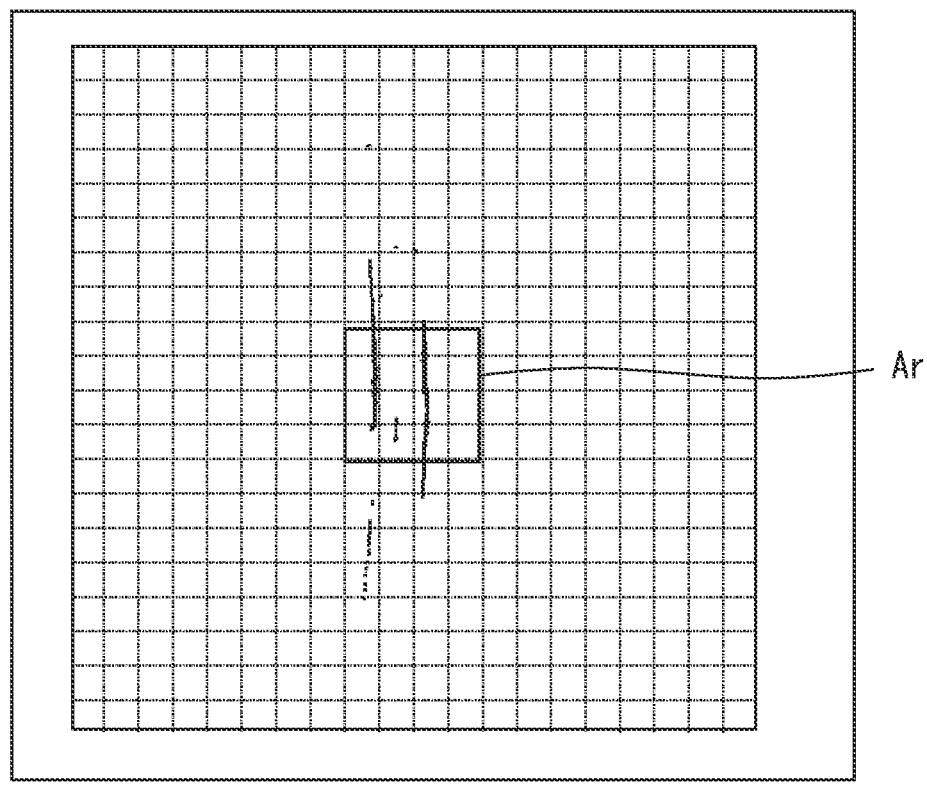
FIG. 4 is a diagram for explaining an example of a set of distance measurement point group data.

The cell map generation unit 205 generates a cell map in which the distance measurement points whose positions are sequentially acquired by the distance measurement point acquisition unit 204 are assigned to each predetermined cell, and stores the distance measurement points in the cell map storage unit 206. As the cell map storage unit 206, for example, a non-volatile memory may be used. As an example, a set of distance measurement point group data (see FIG. 4) for a group of distance measurement points within the detection range for each detection cycle of LIDAR 71, which is sequentially acquired by the distance measurement point acquisition unit 204, is sorted for each cell, and a cell map is generated. In FIG. 4, the Y-axis, which is the vertical axis, indicates the axis in the front-rear direction of the own vehicle, and the X-axis, which is the horizontal axis, indicates the axis in the left-right direction of the own vehicle. The left-right direction of the own vehicle may be referred to as the vehicle width direction. As an example, in the LIDAR 71 of the present embodiment, it is assumed that 3200 distance measurement points are detected in each detection cycle.

The cell map generation unit 205 generates a cell map (see FIG. 5) for a predetermined range (see Ar in FIG. 4) of the set of distance measurement point group data sequentially acquired by the distance measurement point acquisition unit 204. As an example, the range of the cell map is a rectangular range of 12 meter square in front, back, left and right directions of the own vehicle, and the cell is a rectangular unit that is prepared by dividing this range every 30 cm. Vp in FIG. 5 corresponds to the position of the own vehicle. The unit of the cell corresponds to a predetermined division unit, and any unit may be used as long as the detection range of the LIDAR 71 can be divided into a plurality of units. In the cell map, even when there are a plurality of distance measurement points in the cell range, the number of distance measurement points can be reduced by collectively replacing points in each cell with one distance measurement point. Therefore, this cell map generation unit 205 corresponds to the point group reduction unit. By generating the cell map, it is possible to reduce the number of distance measurement points used for the subsequent processing and reduce the processing load.

From the viewpoint of processing load, the cell unit may be preferably less than the value obtained by dividing the range of the detection range of the LIDAR 71 in the left-right direction of the own vehicle by the number of directions. As an example, the unit of the cell may be preferably on the order of several tens of cm to several cm.

The cell map generation unit 205 generates the cell map including the distance measurement point in the rear area of the own vehicle by adding the distance measurement point group data every time the distance measurement point acquisition unit 204 acquires the distance measurement point group data of a new detection cycle. Further, the cell map generation unit 205 may update the cell map by sequentially generating the cell map and sequentially erasing the distance measurement points outside the predetermined range.

The behavior acquisition unit 207 acquires a sensing result by the behavior sensor of the vehicle state sensor 5. The behavior acquisition unit 207 acquires a sensing result of the vehicle speed of the subject vehicle form the vehicle speed sensor, and acquires a sensing result of the subject vehicle from the yaw rate sensor. The behavior acquisition unit 207 may acquire a sensing result of the steering angle of the subject vehicle from the steering sensor instead of the yaw rate angle.

The displacement amount calculation unit 208 calculates the displacement amount of the own vehicle based on the sensing result of the behavior sensor sequentially acquired by the behavior acquisition unit 207. As an example, the displacement amount calculation unit 208 calculates the displacement amount of the own vehicle from the yaw rate of the own vehicle sequentially detected by the yaw rate sensor and the vehicle speed of the own vehicle sequentially detected by the vehicle speed sensor. As an example, each time the distance measurement point acquisition unit 204 acquires the position of the distance measurement point for the new detection cycle of the LIDAR 71, the displacement amount calculation unit 208 calculates the amount of movement of the own vehicle (hereinafter referred to as the amount of displacement during the detection cycle) between the previous detection cycle to the current detection cycle.

The state determination unit 209 determines the distance measurement point as the distance measurement point of the stationary object when the position of the distance measurement point acquired by the distance measurement point acquisition unit 204 for the current detection cycle of the LIDAR 71 is disposed at the position deviated by the amount of displacement in the detection cycle from the position of the distance measurement point acquired by the distance measurement point acquisition unit 204 for the previous detection cycle. On the other hand, when the position is not deviated by the amount of movement in the detection cycle, the distance measurement point is determined to be the distance measurement point of the moving object. As an example, the state determination unit 209 determines whether the distance measurement point of the cell map is the distance measurement point of a stationary object or the distance measurement point of a moving object by deciding whether the position of the distance measurement point in the cell map for the current detection cycle is deviated from the position for the previous detection cycle by the amount of movement of the detection cycle.

The state specifying unit 210 identifies the distance measurement point as the distance measurement point of the stationary object based on the state determination unit 209 determining the distance measurement point of the stationary object, while the state determination unit 209 determines the distance measurement point of the moving object to be determined as the distance measurement point of the moving object. As an example, the state specifying unit 210 assigns the attribute of the stationary object to the distance measurement point in the cell map stored in the cell map storage unit 206, which is determined to be the distance measurement point of the stationary object by the state determination unit 209, and identifies it as the distance measurement point of a stationary object. On the other hand, the state specifying unit 210 assigns the attribute of the moving object to the distance measurement point of the cell map stored in the cell map storage unit 206, which is determined to be the distance measurement point of the moving object by the state determination unit 209, and specifies as the distance measurement point of a moving object.

The road boundary estimation unit 211 estimates the lateral position of the road boundary from the frequency distribution (hereinafter, the right-left direction frequency distribution) indicative of the distribution status of the distance measurement point group, which is a group of distance measurement points whose positions are sequentially acquired by the distance measurement point acquisition unit 204, for each position in the left-right direction of the own vehicle. Specifically, from the most frequent value on each of the left and right sides of the vehicle as a center in the frequency distribution in the left-right direction, the position in the left-right direction of the vehicle indicated by the most frequent value is estimated as the lateral position of the road boundary.

In the present embodiment, the road boundary estimation unit 211 estimates the position in the right-left direction of the vehicle indicated by the most frequent value as the lateral position of the road boundary according to the most frequent value of each of the right and left sides of the vehicle as the center in the right-left direction frequency distribution in the cell map stored in the cell map storage unit 206.

In order to improve the estimation accuracy of the lateral position of the road boundary, the road boundary estimation unit 211 may preferably have a configuration in which the distance measurement point of a moving object that is not a structure for clearly defining the road boundary is not used for the right-left direction frequency distribution. Specifically, the road boundary estimation unit 211 uses the distance measurement point specified as the distance measurement point of the stationary object by the state specifying unit 210 for the frequency distribution in the left-right direction, while the unit 211 does not use the distance measurement point specified as the distance measurement point of the moving object for the left-right direction frequency distribution.

Figure 5:
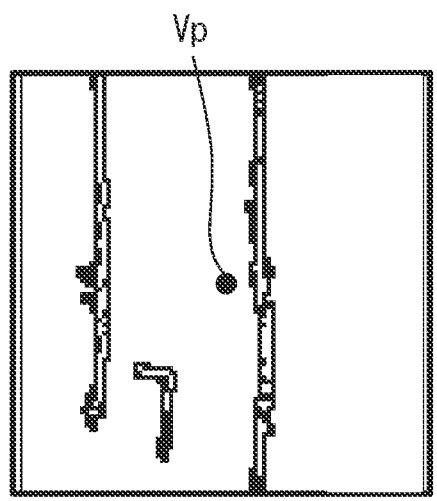
FIG. 5 is a diagram for explaining an example of a cell map generated for the range indicated by Ar in FIG. 4.
Figure 6:
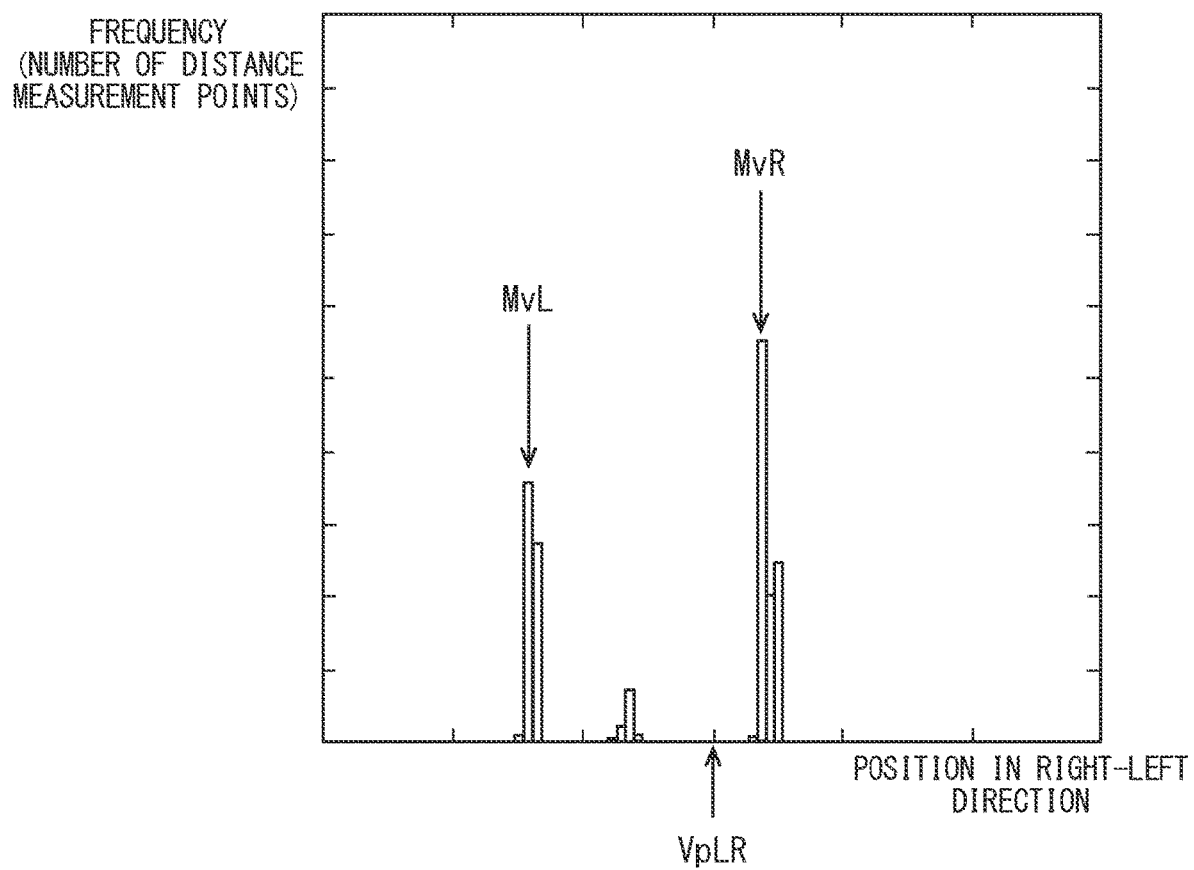
FIG. 6 is a diagram showing an example of a frequency distribution in the right-left direction of the cell map of FIG. 5.

Here, in FIG. 6, an example of a right-left direction frequency distribution diagram (that is, a histogram) of the cell map of FIG. 5 is shown. In the position of the vehicle in the left-right direction, the longer the object continues to exist in the front-rear direction of the vehicle, the greater the frequency of the frequency distribution in the left-right direction. Therefore, as shown in FIG. 6, among the positions in the left-right direction of the own vehicle on the cell map, the more the distance measurement points in the front-rear direction are, the larger the frequency of the left-right direction frequency distribution becomes. VpLR in FIG. 6 indicates the position of the own vehicle in the left-right direction of the own vehicle. MvL in FIG. 6 shows the most frequent value on the left side of the own vehicle in the right-left direction frequency distribution. MvR in FIG. 6 shows the most frequent value on the right side of the vehicle in the right-left direction frequency distribution. In FIG. 6 as an example, the road boundary estimation unit 211 estimates the position in the left-right direction of the own vehicle indicated by MvL as the lateral position of the road boundary on the left side of the own vehicle. Further, the road boundary estimation unit 211 estimates the position in the left-right direction of the own vehicle indicated by MvR as the lateral position of the road boundary on the right side of the own vehicle.

In the position of the vehicle in the left-right direction, the longer the object continues to exist in the front-rear direction of the vehicle, the greater the frequency of the frequency distribution in the left-right direction. Structures such as curbs, guardrails, roadside walls, and poles as lane separation markers (hereinafter referred to as road boundary structures) that define road boundaries may be likely to continue to exist in a certain lateral position with respect to the lane, so that the right-left direction frequency distribution may tend to be lean to the position of the road boundary. Therefore, by estimating the position of the vehicle in the left-right direction indicated by the most frequent value as the lateral position of the road boundary, based on the most frequent value of each of the right side and the left side of the vehicle as the center in the right-left direction frequency distribution, it is possible to estimate the lateral position of the road boundary more accurately.

The stability determination unit 212 determines whether or not the estimation of the lateral position of the road boundary by the road boundary estimation unit 211 is in an unstable state, based on the information of the peaks when the peaks having the frequency of the frequency distribution in the left-right direction equal to or higher than a predetermined value exist other than the most frequent value on one of the left and right sides of the own vehicle as the center. The predetermined value referred to here may be a value that can exclude those that are clearly not road boundary structures, and may be arbitrarily set.

When a peak in which the frequency of the frequency distribution in the left-right direction is equal to or higher than a predetermined value exists on one of the left and right sides centered on the vehicle other than the most frequent value, it is considered to occur in the following situations. For example, in addition to the road boundary structure, there is a congested convoy on one of the left and right sides of the vehicle as the center. In such a situation, the congested vehicle line provides a stationary object that continues to exist for a long time in the front-rear direction of the own vehicle at a certain position in the left-right direction of the own vehicle. Therefore, a large peak may occur at a position other than the road boundary structure.

Figure 7:
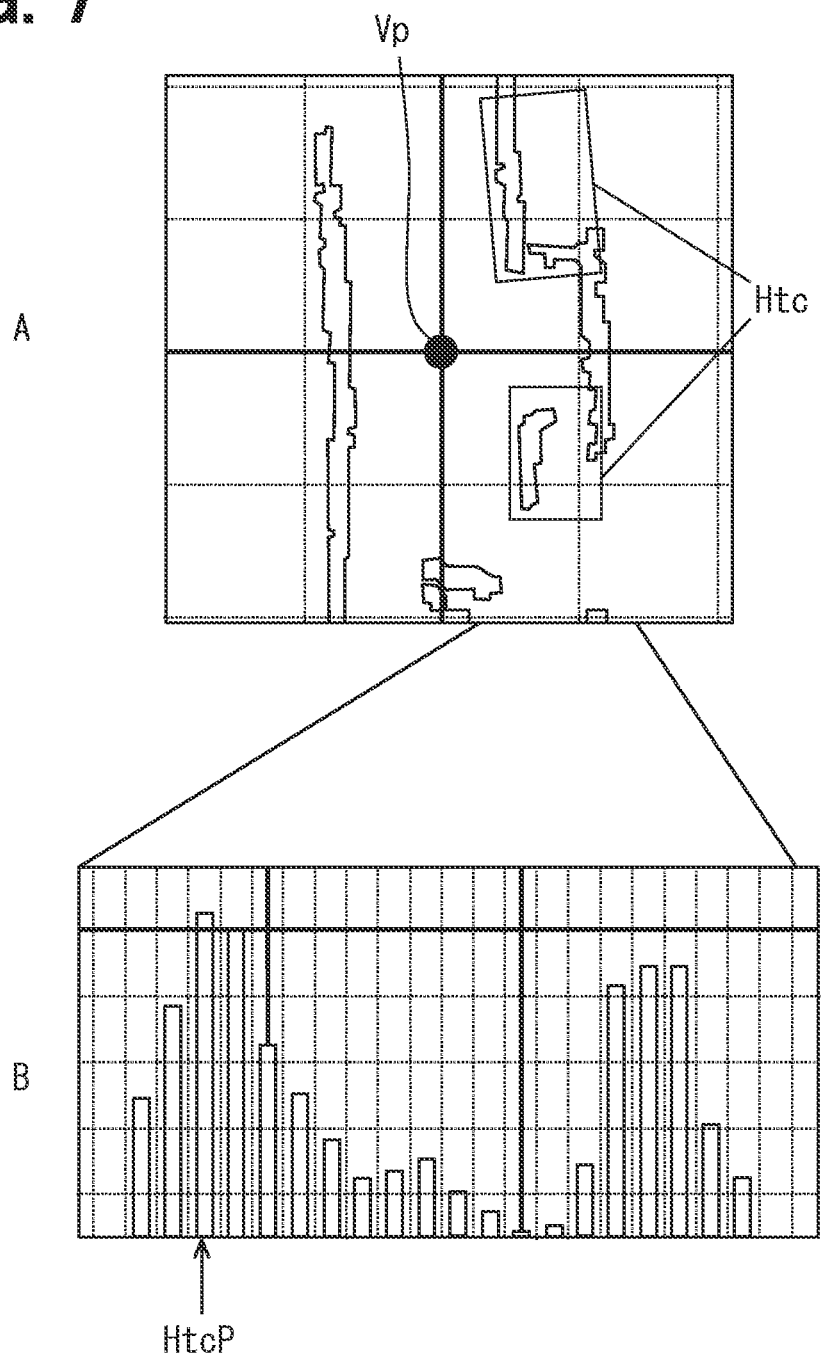
FIG. 7 is a diagram for explaining an example in which a plurality of peaks in which the frequency of the frequency distribution in the right-left direction is equal to or higher than a predetermined value exist on one side of both the left and right sides of the vehicle as the center.

Here, with reference to FIG. 7, an example will be described such that a peak in which the frequency of the frequency distribution in the left-right direction is equal to or higher than a predetermined value exists on one of the left and right sides centered on the vehicle other than the most frequent value. A of FIG. 7 shows an example of a cell map when there is a congested convoy in addition to the road side wall, and Htc shows a group of distance measurement points by the congested convoy. It is assumed that the congested convoy is on the right side of the own vehicle. B in FIG. 7 is a histogram showing the frequency distribution in the left-right direction for a part of the cell map on the right side of the vehicle position Vp in A in FIG. 7. HtcP indicates the peak of the distance measurement point group of the congested convoy.

When there is a congested vehicle line on the right side of the own vehicle, as shown in A of FIG. 7, in addition to the distance measurement point group for the roadside wall, the distance measurement point group for the congested vehicle line (see Htc in FIG. 7) is disposed on the right side of the own vehicle position Vp for a long time in the front-rear direction of the own vehicle. Since vehicles in a congested convoy are often stopped, the distance measurement points for the congested convoy are used as the distance measurement points for stationary objects in the right-left direction frequency distribution. Therefore, as shown in B of FIG. 7, in the frequency distribution in the left-right direction, the peak due to the distance measurement point group of the congested convoy (see HtcP in FIG. 7) may provide the most frequent value. In this case, the road boundary estimation unit 211 may estimate the position other than the road boundary as the lateral position of the road boundary.

On the other hand, in the stability determination unit 212, when there is a peak, in which the frequency of the frequency distribution in the left-right direction is equal to or higher than a predetermined value, other than the most frequent value disposed on one of the left and right sides of the own vehicle as the center, the stability determination unit 212 determines whether or not the estimation of the lateral position of the road boundary by the road boundary estimation unit 211 is in an unstable state according to at least one of the ratio of the frequency of the peak to the frequency of the most frequent value, the number of distance measurement points for the most frequent value, the amount of change of the number of distance measurement points for the most frequent value over time, the distance between the position indicated by the most frequent value and the position indicated by the peak, and the amount of fluctuation of the position of the most frequent value with time. In the following, among the peaks in which the frequency of the frequency distribution in the left-right direction is equal to or higher than a predetermined value, which exist on one side of the left and right sides of the vehicle as the center, the peak corresponding to the most frequent value is referred to as the most frequent value. Peaks other than the most frequent value are called candidate peaks.

In the presence of candidate peaks, when the ratio of the frequency of the candidate peak to the frequency of the most frequent value is large, it is not clear whether the most frequent value is provided by the road boundary structure. On the other hand, when the ratio of the frequency of the other candidate peak to the most frequent value is sufficiently small, it is highly possible that the most frequent value is provided by the road boundary structure. Therefore, when the ratio of the frequency of the candidate peak to the frequency of the most frequent value is used for the determination by the stability determination unit 212, the estimation of the lateral position of the road boundary is unstable when this ratio is equal to or more than the threshold value. On the other hand, when this ratio is less than the threshold value, it may be determined that the estimation of the lateral position of the road boundary is not unstable. The threshold value referred to here may be any value as long as it is a value for classifying whether the possibility is high or low such that the most frequent value is provided by the road boundary structure.

In addition to the road boundary structure, when there is a stationary object that continues to exist in the front-rear direction of the vehicle, it is considered that the number of distance measurement points obtained for the road boundary structure decreases. Therefore, when the number of distance measurement points for the most frequent value is used for the determination by the stability determination unit 212, it is determined that the estimation of the lateral position of the road boundary is unstable when the number of distance measurement points is less than the threshold value. On the other hand, when the number of distance measurement points is equal to or greater than the threshold value, it may be determined that the estimation of the lateral position of the road boundary is not unstable. The threshold value referred to here may be any value as long as it is a value for classifying whether the possibility is high or low such that the most frequent value is provided by the road boundary structure. The number of distance measurement points for the peak of the frequency distribution in the left-right direction may be a configuration using the frequency same as the number of distance measurement points after reduction by generating the cell map, or using the number of distance measurement points before reduction by generating the cell map. The same configuration may be applied to the subsequent description.

In the case of a road boundary structure, the distance measurement points can be stably obtained at similar positions in the left-right direction of the own vehicle, while in the case of a congested convoy, it is considered that the distance measurement points may not be obtained stably since there is space between the vehicles. Therefore, when the change amount of the number of distance measurement points over time with respect to the most frequent value is used for the determination by the stability determination unit 212, it is determined that the estimation of the lateral position of the road boundary is unstable when the change amount is equal to or larger than the threshold value. On the other hand, when the change amount is smaller than the threshold value, it may be determined that the estimation of the lateral position of the road boundary is not unstable. The threshold value referred to here may be any value as long as it is a value for classifying whether the possibility is high or low such that the most frequent value is provided by the road boundary structure.

When the curbstone and the guardrail, which are road boundary structures, exist at the same time, it is considered that the distance between the position indicated by the most frequent value and the position indicated by the candidate peak becomes close. On the other hand, when the road boundary structure and the congested convoy exist at the same time, it is considered that the distance between the position indicated by the most frequent value and the position indicated by the candidate peak becomes long. Therefore, when the distance between the position indicated by the most frequent value and the position indicated by the candidate peak is used for the determination by the stability determination unit 212, it is determined that the estimation of the lateral position of the road boundary is unstable when this distance is equal to or greater than the threshold value. On the other hand, when this distance is less than the threshold value, it may be determined that the estimation of the lateral position of the road boundary is not unstable. The threshold value referred to here may be any value as long as it is a value for classifying whether the possibility is high or low such that the most frequent value is provided by the road boundary structure.

When it is a road boundary structure, stable distance measurement points can be obtained at similar positions in the left-right direction of the own vehicle, while when it is a congested convoy, it is considered that the position of the distance measurement point fluctuates according to the shape of the vehicle and the space between the vehicles. Therefore, when the change amount of the position of the most frequent value over time is used for the determination by the stability determination unit 212, it is determined that the estimation of the lateral position of the road boundary is unstable when the change amount is equal to or larger than the threshold value. On the other hand, when the change amount is smaller than the threshold value, it may be determined that the estimation of the lateral position of the road boundary is not unstable. The threshold value referred to here may be any value as long as it is a value for classifying whether the possibility is high or low such that the most frequent value is provided by the road boundary structure.

As long as it is possible to determine whether or not the estimation of the lateral position of the road boundary by the road boundary estimation unit 211 is unstable, the stability determination unit 212 may use information other than the above. Further, on one side of the left and right sides of the own vehicle as a center, where there are no multiple peaks having the frequency of the frequency distribution in the left-right direction equal to or higher than a predetermined value, it may not be determined whether the estimation of the lateral position of the road boundary by the road boundary estimation unit 211 is in an unstable state. Alternatively, it may be configured to determine that the estimation of the lateral position of the road boundary by the road boundary estimating unit 211 is not in an unstable state.

The traveling lane estimation unit 213 estimates the traveling lane of the subject vehicle based on the traveling lane marking estimated by the lane marking recognition unit 201 when the lane marking recognition unit 201 can recognize the traveling lane marking. As one example, when the traveling lane marking corresponding to the number of lanes indicated by the lane number information has been recognized, the traveling lane of the subject vehicle may be estimated based on the positional relationship of the subject vehicle with respect to the traveling lane markings. Even when the traveling lane markings for the number of lanes indicated by the lane number information has not been recognized, the traveling lane marking of the lane among the lanes indicated by the lane number information is estimated based on the traveling lane marking type, and the traveling lane of the subject vehicle may be estimated based on the positional relationship of the subject vehicle with respect to the traveling lane marking.

On the other hand, when the lane marking unit 201 cannot recognize the traveling lane line, the traveling lane estimation unit 213 estimates the driving lane of the vehicle based on the travelling lane line that has been recognized so far, the information about the number of lanes (hereinafter, target lane number information) corresponding to the vehicle position specified by the vehicle position specifying unit 203, the positional relationship of the lateral position of the road boundary estimated by the road boundary estimation unit 211 with respect to the vehicle position (hereinafter, lateral position relationship). When the target lane number information indicates the multiple lanes on each side, the traveling lane estimation unit 213 may execute this process. When the target lane number information indicates one lane on each side, the traveling lane estimation unit 213 may estimate the one lane as the traveling lane of the subject vehicle. Hereinafter, a process when the target lane number information indicates multiple lanes on each side will be described.

Figure 8:
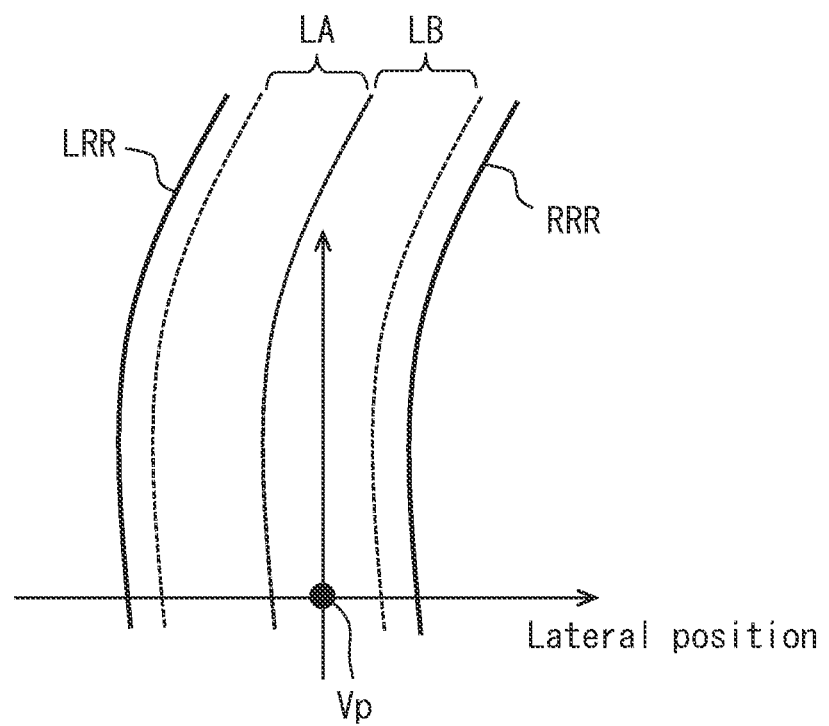
FIG. 8 is a diagram illustrating one example of estimating the traveling lane of the subject vehicle based on traveling lane number information and a lateral direction positional relationship.

Road boundaries are fixed to the lane. Accordingly, by using the target lane number information and the lateral positional relationship, it may be possible to more accurately estimate the traveling lane of the subject vehicle. As an example, as shown in FIG. 8, in the case of two lanes on each side, when the own vehicle is closer to the road boundary on the left than on the right, the left lane may be estimated as the traveling lane of the own vehicle. On the other hand, when the vehicle is closer to the road boundary on the right than on the left, the lane on the right side may be estimated as the driving lane of the vehicle. In FIG. 8, Vp indicates the position of the own vehicle, LA indicates the left lane, LB indicates the right lane, LRR indicates the left road boundary, and RRR indicates the right road boundary. In the case of three or more lanes on each side, the traveling lane of the own vehicle may be estimated depending on which of the divided regions obtained by dividing the region between the left and right road boundaries by the number of lanes includes the own vehicle position.

The configuration may not be limited to a configuration using the lateral positional relationship of each of the left and right road boundaries, and may be configured to use only one of them. In this case, the traveling lane of the own vehicle may be estimated from lanes having the number of lanes indicated by the target lane number information according to the distance between the road boundary and the own vehicle.

Further, the traveling lane estimation unit 213 estimates the driving lane of the vehicle without using the estimation result that the stability determination unit 212 determines that the estimation is unstable among the lateral positions of the road boundary estimated by the road boundary estimation unit 211. This is because, if the driving lane of the own vehicle is estimated using the estimation result that the stability determination unit 212 determines that the estimation is unstable, there is a high possibility that the driving lane of the car will be misestimated according to the position that is not actually the lateral position of the road boundary regarded as the lateral position of the road boundary.

When the traveling lane estimation unit 213 uses only the estimation result for one of the left and right road boundaries, the traveling lane estimation unit 213 may estimate the traveling lane of the own vehicle by using the estimation result of the lateral position for one of the left and right road boundaries. Further, when the estimation result for any of the left and right road boundaries is not used, the traveling lane of the own vehicle may be estimated by using the traveling lane line that has been recognized by the lane marking recognition unit 201. As one example, it is assumed that the traveling lane marking that had been recognized until then continues. Based on a positional relationship between the traveling lane marking and the subject vehicle position, the traveling lane of the subject vehicle may be estimated.

<Traveling Lane Estimation Process in Travelling Lane Estimation Unit 200>

Figure 9:
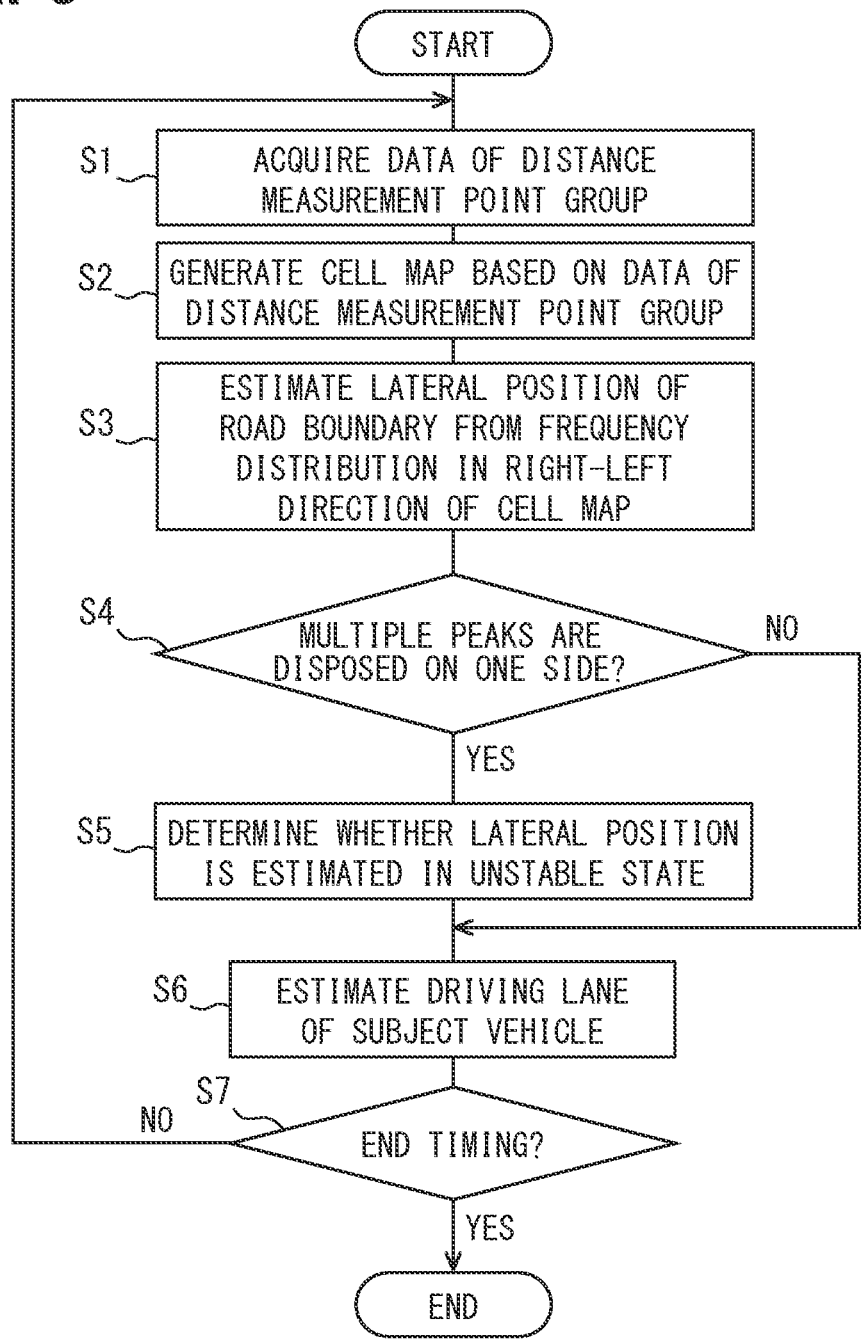
FIG. 9 is a flowchart showing one example of a flow of a traveling lane estimation process by an own vehicle lane estimation unit.

Here, with reference to a flowchart of FIG. 9, one example of a flow of a traveling lane estimation process by the subject vehicle lane estimation unit 200 when the lane marking recognition unit 201 cannot recognize the traveling lane marking will be described. The process shown in FIG. 9 may be configured to start in response to a switch for starting an internal combustion engine or a motor generator of the host vehicle being turned on. The switch for starting the vehicle is also referred to as a power switch. In addition, when the process is configured to switch the setting between manual driving and automatic driving of the subject vehicle, a setting of performing the automatic driving of the subject vehicle may be added to the state.

First, in step S1, the distance measurement point acquisition unit 204 acquires the distance measurement point group data for the group of distance measurement points detected in the latest detection cycle of the LIDAR 71. In step S2, the cell map generation unit 205 distributes the set of distance measurement point group data acquired in S1 for each cell to generate a cell map. Further, the state specifying unit 210 identifies the distance measurement point in the cell map as the distance measurement point of the moving object or the distance measurement point of the stationary object based on the determination result of the state determination unit 209.

In step S3, the road boundary estimation unit 211 estimates the lateral position of the road boundary to be the position in the right-left direction of the subject vehicle indicated by the most frequent value among the most frequent value on each of the left and right sides centered on the vehicle in the frequency distribution in the left-right direction of the cell map generated in S2. It may be preferable that the road boundary estimation unit 211 does not use the distance measurement point specified as the distance measurement point of the moving object in S2 for the frequency distribution in the left-right direction.

In step S4, when there are peaks, in which the frequency of the frequency distribution in the left-right direction is equal to or higher than a predetermined value, on one side of both the left and right sides centered on the own vehicle other than the most frequent value, that is, when there are a plurality of peaks on one side (i.e., "YES" in S4), the process proceeds to step S5. On the other hand, when there are not a plurality of peaks, in which the frequency of the frequency distribution in the left-right direction is equal to or greater than a predetermined value, on either the left or right side of the vehicle (i.e., "NO" in S4), the process proceeds to step S6.

In step S5, the stability determination unit 212 determines whether or not the estimation of the lateral position of the road boundary in S3 is unstable. In step S6, the traveling lane estimation unit 213 estimates the traveling lane of the own vehicle without using the estimation result determined in S5 that the estimation is in an unstable state. In S6, when there is no estimation result determined to be an unstable state in S5 among the lateral positions of the road boundary estimated in S3, the traveling lane of the own vehicle is estimated using this estimation result.

In S7, when the timing is an end timing of the traveling lane estimation process (YES in S7), the traveling lane estimation process ends. On the other hand, when the timing is not the end timing of the traveling lane estimation process (NO in S7), the process returns to S1 and is repeated. One example of the end timing of the traveling lane estimation process includes a case where the power switch of the subject vehicle is turned off, or the like.

Summary of First Embodiment

According to the configuration of the first embodiment, the lateral position of the road boundary can be estimated more accurately from the distance measurement points obtained by the LIDAR 71. In addition, by using the target lane number information and the lateral positional relationship between the own vehicle position and the lateral position of this road boundary, it is possible to estimate which of the multiple existing lanes the own vehicle is traveling in. Here, since the lateral position of the road boundary estimated from the distance measurement point obtained by LIDAR 71 is used, even if it is a section in which it is difficult to recognize the type of the traveling lane line from the image recognition process of the camera image, it is possible to estimate the driving lane of a vehicle. Furthermore, since the estimation result of the lateral position determined to be in an unstable state is not used for the estimation of the traveling lane, it is possible to suppress the reduction of the estimation accuracy of the traveling lane of the own vehicle using the estimation result of the unstable lateral position. As the result, even in the section where it is difficult to recognize the traveling lane marking type based on the image recognition process of the camera image, it may be possible to more accurately estimate the traveling lane of the subject vehicle.

Second Embodiment

In the first embodiment, a configuration is shown in which the state specifying unit 210 assigns an attribute of a stationary object to a distance measurement point determined by the state determination unit 209 to be a distance measurement point of a stationary object, and identifies the distance measurement point of a stationary object. Alternatively, it may not be limited to this feature. For example, the distance measurement point determined by the state determination unit 209 as the distance measurement point of the stationary object may be changed to the distance measurement point of the moving object, and the distance measurement point is specified (hereinafter, in the second embodiment).

Figure 10:
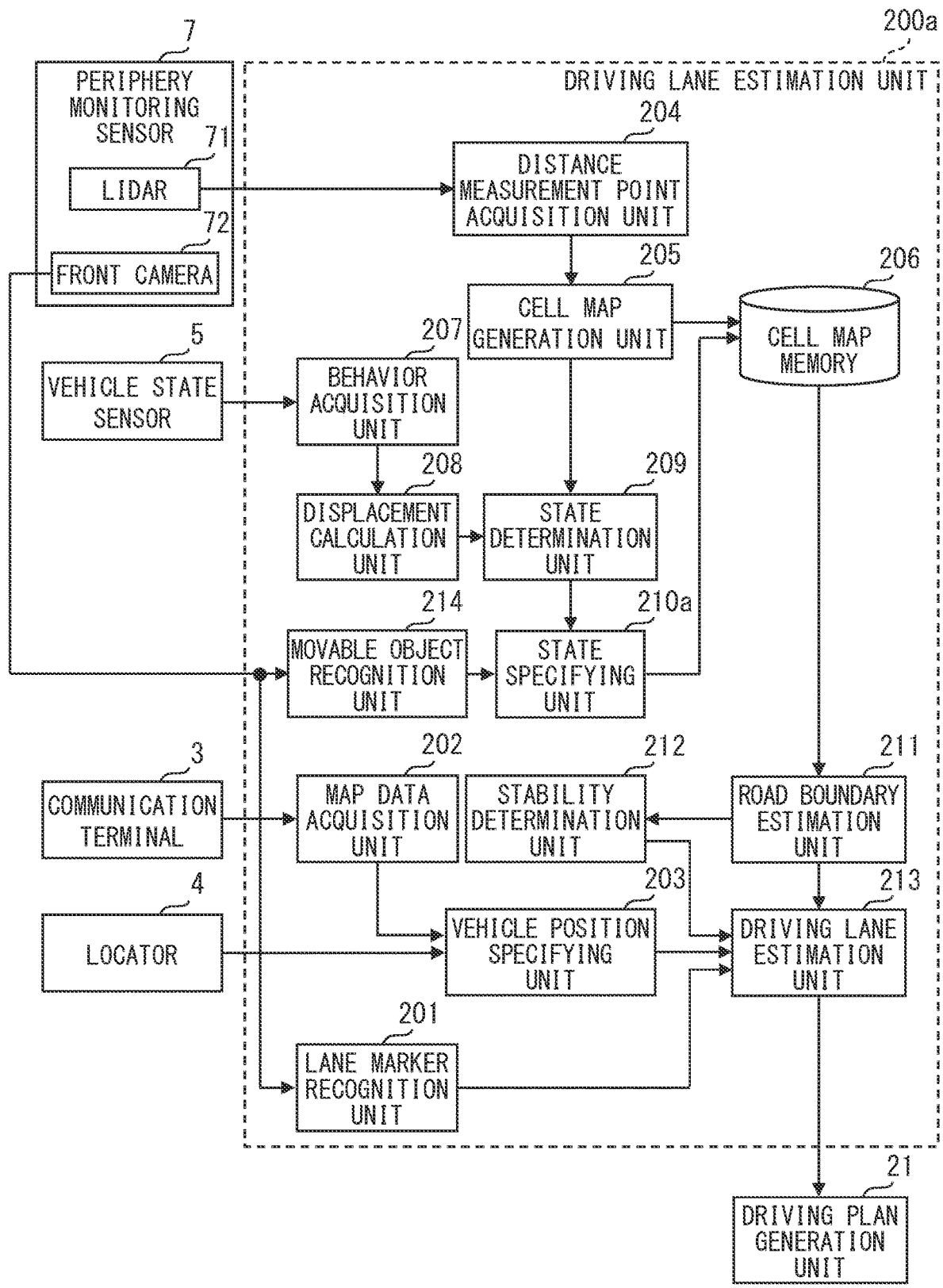
FIG. 10 is a diagram showing one example of a schematic configuration of a subject vehicle lane estimation unit.

The driving assist system 1 of the second embodiment is similar to the driving assist system 1 of the first embodiment except that a subject vehicle lane estimation unit 200a is included instead of the subject vehicle lane estimation unit 200. Here, a schematic configuration of the subject vehicle lane estimation unit 200a will be described with reference to FIG. 10. As shown in FIG. 10, the driving lane estimation unit 200 includes a lane marking recognition unit 201, a map data acquisition unit 202, a vehicle position specifying unit 203, a distance measurement point acquisition unit 204, a cell map generation unit 205, and a cell map storage unit 206, a behavior acquisition unit 207, a displacement amount calculation unit 208, a state determination unit 209, a state specifying unit 210a, a road boundary estimation unit 211, a stability determination unit 212, and a driving lane estimation unit 213, and the movable object recognition unit 214 provided as functional blocks. The travelling lane estimation unit 200a is similar to the travelling lane estimation unit 200 of the first embodiment except that the state specifying unit 210a is provided instead of the state specifying unit 210 and the movable object recognition unit 214 is provided.

The movable object recognition unit 214 recognizes a movable object (hereinafter referred to as a movable object) from an image captured by the front camera 72 that captures a predetermined range in front of the own vehicle. Examples of movable objects include vehicles such as automobiles and pedestrians. The movable object recognition unit 214 recognizes a movable object by performing image recognition processing such as edge detection and pattern recognition on the captured images sequentially output from the front camera 72. In addition, the movable object recognition unit 214 also specifies the position coordinates of the area occupied by the movable object with respect to the own vehicle from the camera parameters of the front camera 72 and the area of the movable object in the captured image. The movable object recognition unit 214 may be configured to recognize the movable object from the captured images sequentially output from the front camera 72 by the image recognition process by machine learning.

Similar to the state specifying unit 210 of the first embodiment, the state specifying unit 210a specifies the distance measurement point as the distance measurement point of the stationary object based on the state determination unit 209 determining the distance measurement point of the stationary object. On the other hand, the distance measurement point determined by the state determination unit 209 as the distance measurement point of the moving object is specified as the distance measurement point of the moving object.

Further, the state specifying unit 210a specifies a distance measurement point located in a region where the movable object recognition unit 214 recognizes a movable object as the distance measurement point of the moving object even if the distance measurement point is determined by the state determination unit 209 to be a distance measurement point of a stationary object. As an example, the state specifying unit 210a changes the attribute of the distance measurement point disposed in the region where the movable object recognition unit 214 recognizes the movable object to be the attribute of the moving object, and specifies as the distance measurement point of the moving object even if the distance measurement point of the cell map stored in the cell map storage unit 206, which is determined by the state determination unit 209 to be the distance measurement point of the stationary object, is assigned as the attribute of the stationary object. Then, the road boundary estimation unit 211 estimates the lateral position of the road boundary without using the distance measurement point specified as the distance measurement point of the moving object by the state specifying unit 210a in the right-left direction frequency distribution.

When the LIDAR 71 obtains a distance measurement point for a peripheral vehicle such as a parked vehicle or a vehicle in a congested convoy that is temporarily stopped, the state determination unit 209 may determine that the stopped or parked peripheral vehicle provides a distance measurement point of a stationary object. Therefore, when a plurality of parked vehicles are lined up along the lane or a congested vehicles are lined up, as shown in FIG. 7, the peak at which the frequency of the right-left direction frequency distribution exceeds a predetermined value may be generated at a position on one side of the left and right sides of the vehicle as the center other than the position of the road side wall.

On the other hand, according to the configuration of the second embodiment, the state specifying unit 210a specifies the distance measurement point of the moving object for the distance measurement point located in the region where the movable object is recognized from the image captured by the front camera 72. Then, the road boundary estimation unit 211 estimates the lateral position of the road boundary without using the distance measurement point specified as the distance measurement point of the moving object by the state specifying unit 210a in the right-left direction frequency distribution.

Therefore, even if the peripheral vehicle is stopped, the distance measurement point for the peripheral vehicle is not used for the right-left direction frequency distribution, and it is possible to prevent from generating the peak having the frequency of the right-left direction frequency distribution equal to or higher than the predetermined value at a position on one of the left and right sides of the vehicle as the center other than the position of the road side wall. Therefore, according to the configuration of the second embodiment, even when a plurality of parked vehicles are lined up along the lane or a congested vehicles are lined up, it is possible to prevent the road boundary estimation unit 211 from mistakenly estimating the position of these vehicles as the lateral position of the road boundary. In addition, the movable object recognized by the movable object recognition unit 214 may be limited to the peripheral vehicles of the own vehicle.

Third Embodiment

The configuration of the following third embodiment may be applied. The driving assist system 1 of the third embodiment is similar to the driving assist system 1 of the second embodiment except that a subject vehicle lane estimation unit 200b is included instead of the subject vehicle lane estimation unit 200a.

Figure 11:
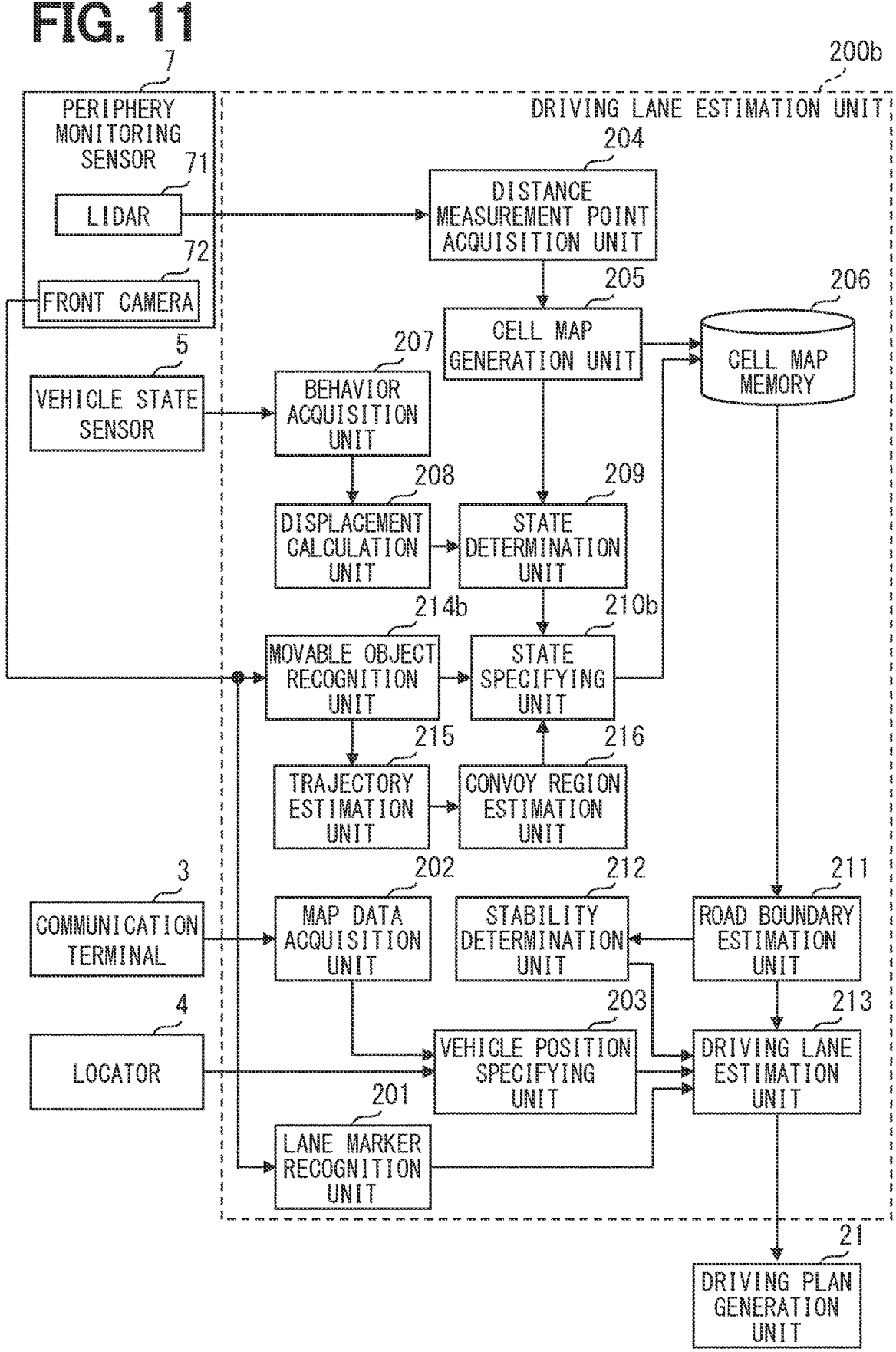
FIG. 11 is a diagram showing one example of a schematic configuration of a subject vehicle lane estimation unit.

Here, a schematic configuration of the subject vehicle lane estimation unit 200b will be described with reference to FIG. 11. As shown in FIG. 11, the driving lane estimation unit 200b includes a lane marking recognition unit 201, a map data acquisition unit 202, a vehicle position specifying unit 203, a distance measurement point acquisition unit 204, a cell map generation unit 205, and a cell map storage unit 206, a behavior acquisition unit 207, a displacement amount calculation unit 208, a state determination unit 209, a state specifying unit 210b, a road boundary estimation unit 211, a stability determination unit 212, and a driving lane estimation unit 213, the movable object recognition unit 214b, the trajectory estimation unit 215 and the convoy region estimation unit 216 provided as functional blocks. The travelling lane estimation unit 200b includes a state specifying unit 210b and a movable object recognition unit 214b instead of the state specifying unit 210a and the movable object recognition unit 214, and a trajectory estimation unit 215 and a convoy region estimation unit 216. Except for this feature, the unit 200b is similar to the travelling lane estimation unit 200a of the second embodiment.

The movable object recognition unit 214b is similar to the movable object recognition unit 214 of the first embodiment, except that the unit 214b recognizes the peripheral vehicles of the own vehicle from the captured images sequentially output from the front camera 72.

The trajectory estimation unit 215 estimates the traveling locus of the peripheral vehicle based on the peripheral vehicles sequentially recognized by the movable object recognition unit 214b. As an example, the regression curve obtained by performing regression analysis for curve fitting based on the point group of the position coordinates of the peripheral vehicles sequentially recognized by the movable object recognition unit 214b may be estimated as the traveling trajectory of the peripheral vehicles. Alternatively, the traveling locus of the peripheral vehicles may be estimated by estimating the road shape model with the Kalman filter based on the position coordinates of the peripheral vehicles sequentially recognized by the movable object recognition unit 214b. As the position coordinates of the periphery vehicle, for example, a coordinate obtained by converting the periphery vehicle position with respect to the subject vehicle into coordinates of the longitude and the latitude based on the subject vehicle position may be used. The traveling trajectory of peripheral vehicles is estimated for each peripheral vehicle that can be recognized by the movable object recognition unit 214b.

When the movable object recognition unit 214b can recognize a plurality of peripheral vehicles, the convoy area estimation unit 216 estimates the region of the convoy that includes multiple peripheral vehicles, according to the traveling locus of the peripheral vehicles recognized by the movable object recognition unit 214b and estimated by the trajectory estimation unit 215. As an example, when the distance between the lateral positions of the traveling trajectories of a plurality of peripheral vehicles is less than the division distance, the traveling trajectories are the trajectories of the same convoy, and the area that expands to the left and right by the width of the surrounding vehicles around the travel trajectory of one of the peripheral vehicles among the travelling trajectories of the same convoy as the center is estimated to be the area of the convoy. The distinguishing distance described here is a distance for distinguishing the traveling trajectory in the same lane and the traveling trajectory in the different lane, and can be arbitrarily set. For example, the distance may be less than a road width, and also equal to or larger than half the road width. The road width may be specified from the map data. Further, the vehicle width of the peripheral vehicle may be specified from the vehicle width of the peripheral vehicle recognized by the movable object recognition unit 214b, or the vehicle width of the average vehicle may be virtually used.

Similar to the state specifying unit 210a of the second embodiment, the state specifying unit 210b specifies the distance measurement point as the distance measurement point of the stationary object based on the state determination unit 209 determining the distance measurement point of the stationary object. On the other hand, the distance measurement point determined by the state determination unit 209 as the distance measurement point of the moving object is specified as the distance measurement point of the moving object. Further, the state specifying unit 210b specifies a distance measurement point located in a region where the movable object recognition unit 214b recognizes a periphery vehicle as the distance measurement point of the moving object even if the distance measurement point is determined by the state determination unit 209 to be a distance measurement point of a stationary object.

Further, the state specifying unit 210b specifies a distance measurement point located in a region where the convoy area estimation unit 216 estimates as a convoy area as the distance measurement point of the moving object even if the distance measurement point is determined by the state determination unit 209 to be a distance measurement point of a stationary object. As an example, the state specifying unit 210b changes the attribute of the distance measurement point disposed in the region where the convoy area estimation unit 216 estimates as a convoy area, and specifies as the distance measurement point of the moving object even if the distance measurement point of the cell map stored in the cell map storage unit 206, which is determined by the state determination unit 209 to be the distance measurement point of the stationary object, is assigned as the attribute of the stationary object. Then, the road boundary estimation unit 211 estimates the lateral position of the road boundary without using the distance measurement point specified as the distance measurement point of the moving object by the state specifying unit 210b in the right-left direction frequency distribution.

Figure 12:
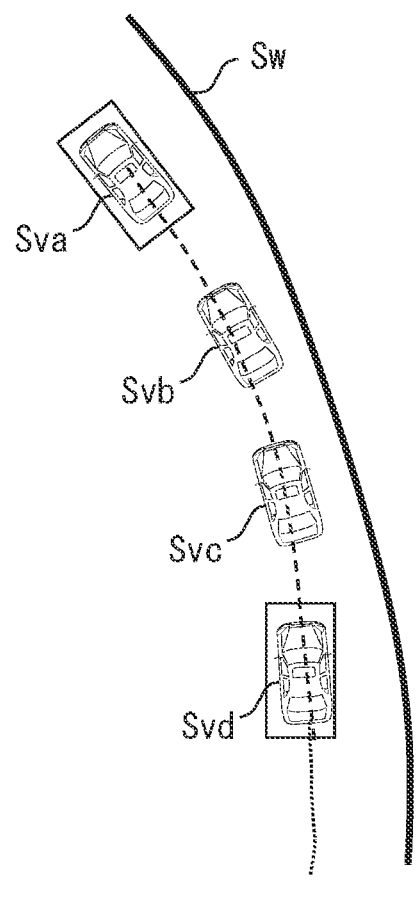
FIG. 12 is a diagram for explaining an example in which a vehicle included in a congested convoy cannot be recognized as a peripheral vehicle by the movable object recognition unit.

Vehicles included in the congested convoy may not be recognized as a periphery vehicle by the movable object recognition unit 214b since the vehicles are disposed behind other vehicles included in the congested convoy, and the pattern recognition can not be performed from the image captured by the front camera 72. Here, FIG. 12 will be described as an example. In FIG. 12, Sva, Svb, Sbc, and Svd indicate peripheral vehicles included in the congested convoy, and Hv indicates the own vehicle. Sw in FIG. 12 indicates the road side wall, the broken line indicates the traveling trajectory of the peripheral vehicle Sva, and the dotted line indicates the traveling trajectory of the peripheral vehicle Svd. Further, a peripheral vehicle surrounded by a rectangular frame indicates a peripheral vehicle that can be recognized as a peripheral vehicle by the movable object recognition unit 214b. Among the peripheral vehicles included in the congested convoy, the peripheral vehicles Svb and Svc cannot be recognized as peripheral vehicles from the image captured by the front camera 72 of the own vehicle Hv because they are blocked by the peripheral vehicles Svd.

As with the peripheral vehicles Svb and Svc in FIG. 12, the distance measurement point for the peripheral vehicle that cannot be recognized as the peripheral vehicle from the image captured by the front camera 72 may be determined as the distance measurement point of a stationary object by the state determination unit 209 when the peripheral vehicle is temporarily stopped. Further, since it cannot be recognized as a peripheral vehicle from the image captured by the front camera 72, in the case of the configuration of the second embodiment, it may not be changed to the distance measurement point of the moving object and may be specified as the distance measurement point of the stationary object. Therefore, if there is a peripheral vehicle included in the congested convoy that cannot be recognized as a peripheral vehicle from the image captured by the front camera 72, the peak in which the frequency of the right-left direction frequency distribution exceeds a predetermined value may be generated on one side of the left and right sides centered on the vehicle other than the position of the road side wall.

On the other hand, according to the configuration of the third embodiment, when the movable object recognition unit 214b can recognize a plurality of peripheral vehicles Sva and Svd, the convoy area estimation unit 216 estimates the area of the convoy including a plurality of peripheral vehicles Sva and Svd according to the traveling trajectories of the recognized peripheral vehicles Sva and Svd. Further, the state specifying unit 210b specifies a distance measurement point located in a region where the convoy area estimation unit 216 estimates as a convoy area as the distance measurement point of the moving object even if the distance measurement point is determined by the state determination unit 209 to be a distance measurement point of a stationary object. Then, the road boundary estimation unit 211 estimates the lateral position of the road boundary without using the distance measurement point specified as the distance measurement point of the moving object by the state specifying unit 210b in the right-left direction frequency distribution.

Therefore, even if the peripheral vehicles Svc and Svb that cannot be recognized by the movable object recognition unit 214b are temporarily stopped, when the distance measurement points for the peripheral vehicles Svc and Svb are located in the region estimated as the convoy area, in which the peripheral vehicles Svc and Svb are included, by the convoy region estimation unit 216, the state specifying unit 210b does not specifies as the distance measurement points of the stationary object, but specifies as the distance measurement points of the moving object. As a result, the distance measurement points for the peripheral vehicles Svc and Svb that cannot be recognized by the movable object recognition unit 214b are not used for the right-left direction frequency distribution, and it is possible to suppress the generation of the peak having the frequency of the horizontal frequency distribution equal to or higher than the predetermined value on one of the left and right sides of the vehicle as the center other than the position of the road side wall. Therefore, according to the configuration of the third embodiment, even if there are peripheral vehicles included in the congested convoy that cannot be recognized as peripheral vehicles from the image captured by the front camera 72, it is possible for the road boundary estimation unit 211 to prevent from erroneously estimating the position of these vehicles as the lateral position of the road boundary.

Fourth Embodiment

The configuration of the following fourth embodiment may be applied. The driving assist system 1 of the fourth embodiment is similar to the driving assist system 1 of the third embodiment except that a subject vehicle lane estimation unit 200c is included instead of the subject vehicle lane estimation unit 200b.

Figure 13:
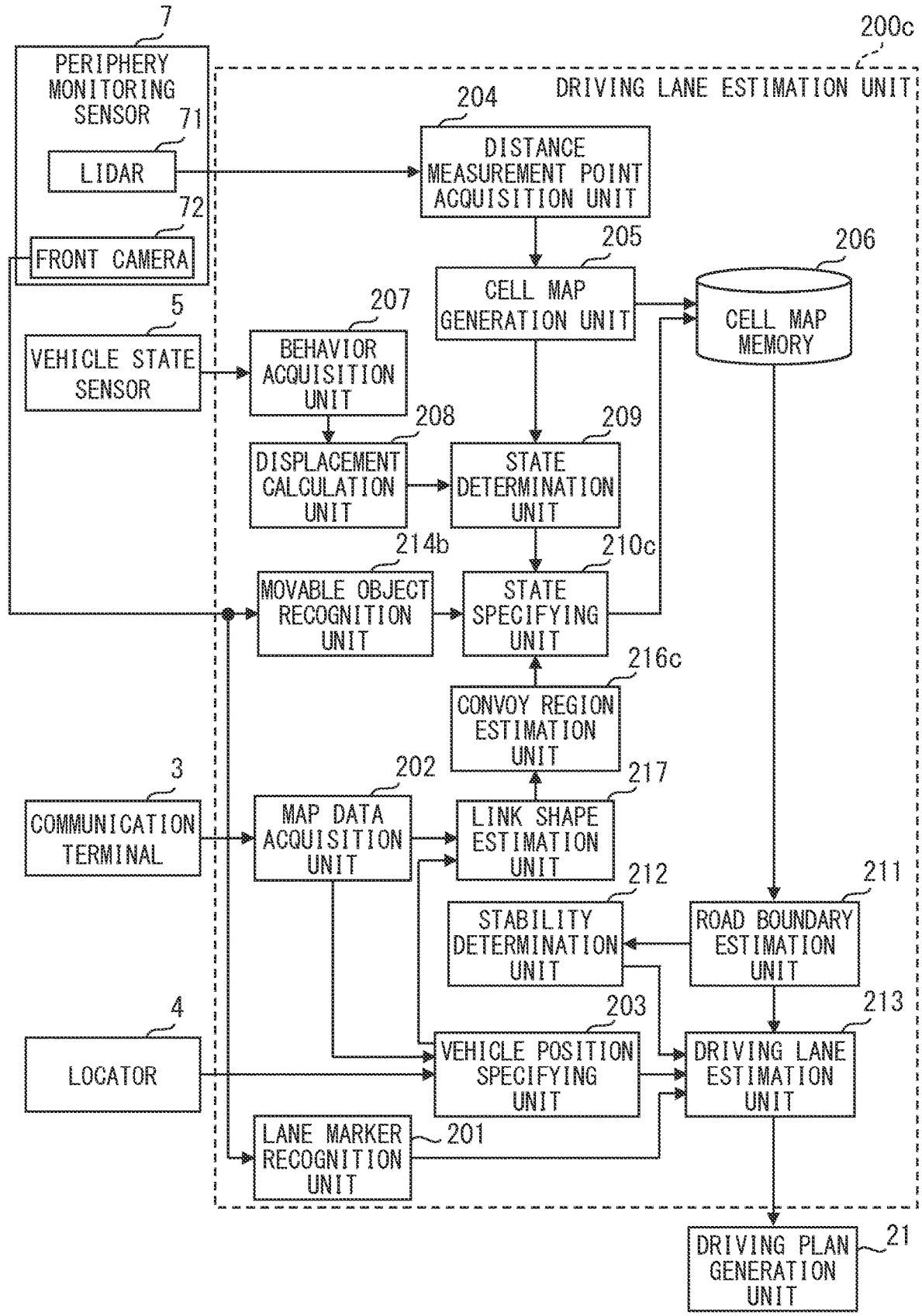
FIG. 13 is a diagram showing one example of a schematic configuration of a subject vehicle lane estimation unit.

Here, a schematic configuration of the subject vehicle lane estimation unit 200c will be described with reference to FIG. 13. As shown in FIG. 13, the driving lane estimation unit 200c includes a lane marking recognition unit 201, a map data acquisition unit 202, a vehicle position specifying unit 203, a distance measurement point acquisition unit 204, a cell map generation unit 205, and a cell map storage unit 206, a behavior acquisition unit 207, a displacement amount calculation unit 208, a state determination unit 209, a state specifying unit 210c, a road boundary estimation unit 211, a stability determination unit 212, and a driving lane estimation unit 213, the movable object recognition unit 214b, the convoy region estimation unit 216c and the link shape estimation unit 217 provided as functional blocks. The travelling lane estimation unit 200c is similar to the travelling lane estimation unit 200b of the third embodiment except that the unit 200c includes a state specifying unit 210c and a convoy area estimation unit 216c instead of the state specifying unit 210b and the convoy area estimation unit 216, and a link shape estimation unit 217.

The link shape estimation unit 217 estimates the link shape along the position of the peripheral vehicle based on the position of the peripheral vehicle recognized by the movable object recognition unit 214b and the link shape information acquired by the map data acquisition unit 202. As an example, the position of the surrounding vehicle with respect to the own vehicle recognized by the movable object recognition unit 214b is converted to the position on the map according to the own vehicle position specified by the vehicle position specifying unit 203 and the map data acquired by the map data acquisition unit 202. Then, among the link shapes indicated by the link shape information acquired by the map data acquisition unit 202, the link shape closest to the position of the peripheral vehicle on the map is estimated to be the link shape along the position of the peripheral vehicle. That is, the link shape estimation unit 217 estimates the link shape of the lane in which the surrounding vehicle travels.

When the movable object recognition unit 214b can recognize a plurality of peripheral vehicles, the convoy area estimation unit 216c estimates the region of the convoy that includes multiple peripheral vehicles, according to the link shape of the peripheral vehicles recognized by the movable object recognition unit 214b and estimated by the link shape estimation unit 217. As an example, the region expanding by the width of the peripheral vehicles to the left and right around the approximate curve connecting the coordinate sequences of the link shape estimated for the peripheral vehicles is estimated to be the region of the convoy. Further, the vehicle width of the peripheral vehicle may be specified from the vehicle width of the peripheral vehicle recognized by the movable object recognition unit 214b, or the vehicle width of the average vehicle may be virtually used. Since the peripheral vehicle travels along the lane, the area of the convoy can be estimated by using the link shape along the position of the peripheral vehicle in the same manner as the traveling locus of the peripheral vehicle according to the third embodiment.

Similar to the state specifying unit 210a of the second embodiment, the state specifying unit 210c specifies the distance measurement point as the distance measurement point of the stationary object based on the state determination unit 209 determining the distance measurement point of the stationary object. On the other hand, the distance measurement point determined by the state determination unit 209 as the distance measurement point of the moving object is specified as the distance measurement point of the moving object. Further, the state specifying unit 210c specifies a distance measurement point located in a region where the movable object recognition unit 214b recognizes a periphery vehicle as the distance measurement point of the moving object even if the distance measurement point is determined by the state determination unit 209 to be a distance measurement point of a stationary object.

Further, as in the state specifying unit 210b of the third embodiment, the state specifying unit 210c specifies a distance measurement point that is disposed in the area estimated to be the area of the convoy by the convoy area estimation unit 216c as the distance measurement point of the moving object even if the state determination unit 209 determines as a distance measurement point of a stationary object. Then, the road boundary estimation unit 211 estimates the lateral position of the road boundary without using the distance measurement point specified as the distance measurement point of the moving object by the state specifying unit 210c in the right-left direction frequency distribution.

According to the configuration of the fourth embodiment, as in the configuration of the third embodiment, even if a peripheral vehicle that cannot be recognized by the movable object recognition unit 214b is temporarily stopped, when the distance measurement point of the periphery vehicle is disposed in the area where the convoy area estimation unit 216c estimates the convoy area including the periphery vehicle, the state specifying unit 210c does not specify as the distance measurement point of the stationary object, but specifies as the distance measurement point for the moving object. Therefore, even if there are peripheral vehicles included in the congested convoy that cannot be recognized as peripheral vehicles from the image captured by the front camera 72, it is possible for the road boundary estimation unit 211 to prevent from erroneously estimating the position of these vehicles as the lateral position of the road boundary.

Fifth Embodiment

In the above-described embodiment, the road boundary estimation unit 211 does not use the distance measurement points, identified by the state specifying units 210, 210a, 210b, 210c as the distance measurement points of the moving object, for the frequency distribution in the left-right direction, and the lateral position of the road boundary is estimated. But, it may not be limited to these features. For example, the driving support system 1 may not include the state determination unit 209 and the state specifying units 210, 210a, 210b, 210c, and the distance measurement point may be used for the frequency distribution in the left-right direction regardless of whether the distance measurement point is provided by a moving object or a stationary object.

Sixth Embodiment

In the above-described embodiment, the cell map generation unit 205 has a configuration in which a set of distance measurement point group data acquired by the distance measurement point acquisition unit 204 is distributed to each cell to generate a cell map. But, it may not be limited to these features. For example, the cell map may not be generated. In this case, the road boundary estimation unit 211 estimates the lateral position of the road boundary from the right-left direction frequency distribution of the distance measurement point group whose position is sequentially acquired by the distance measurement point acquisition unit 204 without generating a cell map.

Seventh Embodiment

In the above-described embodiment, when the lane marking unit 201 cannot recognize the traveling lane line, the traveling lane of the own vehicle is estimated using the lateral position of the road boundary estimated by the road boundary estimation unit 211. But, it may not be limited to these features. For example, even when the lane marking unit 201 can recognize the traveling lane line, the traveling lane of the own vehicle may be estimated using the lateral position of the road boundary estimated by the road boundary estimation unit 211. In this case, the estimation accuracy of the traveling lane of the subject vehicle may be improved by using each other in a reinforcing manner, or the like.

Eighth Embodiment

The embodiment described above has shown the example in the case where the traveling lane of the subject vehicle is estimated based on the traveling lane marking recognized by the lane marking recognition unit 201. However, it is not limited to this. For example, the traveling lane marking recognized by the lane marking recognition unit 201 may not be used. In this configuration, when the traveling lane of the subject vehicle cannot be estimated based on the traveling lane number information and the lateral direction positional relationship, it may be temporarily assumed that the subject vehicle is positioned in a traveling lane provisionally identified by the subject vehicle position specifying unit 203. When the traveling lane of the subject vehicle can be estimated based on the traveling lane number information and the lateral direction positional relationship, the estimation result of the traveling lane of the subject vehicle may be updated. The control unit and the method thereof described in the present disclosure are realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

Although the present disclosure has been described in accordance with the examples, it is understood that the present disclosure is not limited to such examples or structures. The present disclosure also includes various modifications and modifications within an equivalent range. In addition, various combinations and forms, and further, other combinations and forms including only one element, or more or less than these elements are also within the sprit and the scope of the present disclosure.

What is claimed is:

1. A travel lane estimation device for a vehicle comprising:
a distance measurement point acquisition unit that acquires a position of a distance measurement point detected by a distance measurement sensor that transmits an exploration wave around the vehicle, receives a reflection wave of the exploration wave reflected by an object, and detects the position of the distance measurement point with respect to the vehicle, the position being disposed on a surface of the object at which the exploration wave is reflected;
a road boundary estimation unit that estimates a lateral position of a road boundary to be a position in a right-left direction of the vehicle indicated by a most frequent value of each of a right side and a left side of the vehicle as a center in a frequency distribution that indicates a distribution status of a distance measurement point group, which is a group of the distance measurement points sequentially acquired by the distance measurement point acquisition unit, for each position in the right-left direction of the vehicle;
a stability determination unit that determines whether estimation of the lateral position of the road boundary by the road boundary estimation unit is in an unstable state, according to information about a plurality of peaks when the plurality of peaks having a frequency in the frequency distribution equal to or higher than a predetermined value are disposed on one side of a left side and a right side of the vehicle as a center;
a map data acquisition unit that acquires a map data including information about a numerical number of traffic lanes;
a vehicle position specifying unit that specifies a vehicle position of the vehicle on a map according to the map data acquired by the map data acquisition unit; and
a traveling lane estimation unit that estimates a travel lane of the vehicle based on the information about the numerical number of traffic lanes corresponding to the vehicle position specified by the vehicle position specifying unit and included in the map data acquired by the map data acquisition unit, and a position relationship between the lateral position of the road boundary estimated by the road boundary estimation unit and the vehicle position, wherein:

the traveling lane estimation unit estimates the travel lane of the vehicle without using an estimation result of the lateral position of the road boundary estimated by the road boundary estimation unit, which is determined to be the unstable state by the stability determination unit; and the traveling lane estimation device further comprising:

a point group reduction unit that sorts the distance measurement points, whose positions are sequentially acquired by the distance measurement point acquisition unit, into predetermined division units that are prepared by dividing a detection range of the distance measurement sensor, and replaces and combines the distance measurement points for each division unit into one distance measurement point, wherein the road boundary estimation unit estimates the lateral position of the road boundary to be a position in the right-left direction of the vehicle indicated by the most frequent value of each of the right side and the left side of the vehicle as the center in the frequency distribution of the distance measurement point group that is prepared by the point group reduction unit by replacing and combining the distance measurement points sequentially obtained by the distance measurement point acquisition unit for each division unit into one distance measurement point.

2. The travel lane estimation device according to claim 1, wherein when there is a peak, in which the frequency of the frequency distribution is equal to or higher than a predetermined value, other than the most frequent value disposed on one of the left side and the right side of the vehicle as the center, the stability determination unit determines whether the estimation of the lateral position of the road boundary by the road boundary estimation unit is in the unstable state according to at least one of a ratio of the frequency of the peak with respect to the frequency of the most frequent value, a numerical number of the distance measurement points for the most frequent value, an amount of a change of the numerical number of distance measurement points for the most frequent value over time, a distance between the position indicated by the most frequent value and the position indicated by the peak, and an amount of a change of the position of the most frequent value over time.

3. The travel lane estimation device according to claim 1, further comprising:

a behavior acquisition unit that acquires a sensing result by a behavior sensor for detecting a physical state quantity related to a behavior of the vehicle;

a movement amount calculation unit that calculates a movement amount of the vehicle based on the sensing result of the behavior sensor that is sequentially acquired by the behavior acquisition unit;

a state determination unit that determines a distance measurement point of a stationary object to be a distance measurement point having a position acquired by the distance measurement point acquisition unit for a detection cycle of the distance measurement sensor at a present time, which corresponds to a position shifted from a position of a distance measurement point acquired by the distance measurement point acquisition unit for a detection cycle of the distance measurement sensor at a previous time by the movement amount of the vehicle between the detection cycle at the previous time and the detection cycle at the present time, and determines a distance measurement point of a moving object to be a distance measurement point having a position which does not correspond to the position shifted from the position at the previous time by the movement amount; and a state specifying unit that specifies the distance measurement point as the distance measurement point of the stationary object when the state determination unit determines the distance measurement point of the stationary object, and specifies the distance measurement point as the distance measurement point of the moving object when the state determination unit determines the distance measurement point of the moving object, wherein:

the distance measurement point specified as the distance measurement point of the stationary object by the state specifying unit is used for the frequency distribution; and the distance measurement point specified as the distance measurement point of the moving object by the state specifying unit is not used for the frequency distribution.

4. The travel lane estimation device according to claim 3, further comprising:

a movable object recognition unit that recognizes a movable object that is movable, according to an image captured by a camera that images a periphery of the vehicle is provided, wherein the state specifying unit specifies the distance measurement point as the distance measurement point of the moving object when the position of the distance measurement point is disposed in a region where the movable object recognition unit recognizes the movable object even in a case where the state determination unit determines the distance measurement point of the stationary object.

5. The travel lane estimation device according to claim 4, wherein the moving object recognized by the movable object recognition unit is a peripheral vehicle around the vehicle, the travel lane estimation device further comprising:

a trajectory estimation unit that estimates a traveling trajectory of the peripheral vehicle based on the peripheral vehicle that is sequentially recognized by the movable object recognition unit; and a convoy area estimation unit that estimates an area of a convoy including a plurality of peripheral vehicles based on the traveling trajectory estimated by the trajectory estimation unit with respect to the peripheral vehicle recognized by the movable object recognition unit when the movable object recognition unit recognizes the plurality of the peripheral vehicles, wherein the state specifying unit specifies the distance measurement point of the moving object to be the distance measurement point disposed in the area where the convoy area estimation unit estimates the area of the convoy even in a case where the state determination unit determines the distance measurement point as the distance measurement point of the stationary object.

6. The travel lane estimation device according to claim 4, wherein:

the moving object recognized by the movable object recognition unit is a peripheral vehicle around the vehicle; and the map data acquisition unit acquires the map data further including a link shape information, the travel lane estimation device further comprising:

a link shape estimation unit that estimates a link shape along the position of the peripheral vehicle based on the position of the peripheral vehicle recognized by the movable object recognition unit and the link shape information acquired by the map data acquisition unit; and a convoy area estimation unit that estimates an area of a convoy including a plurality of peripheral vehicles based on the link shape estimated by the link shape estimation unit with respect to the peripheral vehicle recognized by the movable object recognition unit when the movable object recognition unit recognizes the plurality of the peripheral vehicles, wherein the state specifying unit specifies the distance measurement point of the moving object to be the distance measurement point disposed in the area where the convoy area estimation unit estimates the area of the convoy even in a case where the state determination unit determines the distance measurement point as the distance measurement point of the stationary object.

7. A travel lane estimation method for a vehicle comprising:

acquiring a position of a distance measurement point detected by a distance measurement sensor that transmits an exploration wave around the vehicle, receives a reflection wave of the exploration wave reflected by an object, and detects the position of the distance measurement point with respect to the vehicle, the position being disposed on a surface of the object at which the exploration wave is reflected;

estimating a lateral position of a road boundary to be a position in a right-left direction of the vehicle indicated by a most frequent value of each of a right side and a left side of the vehicle as a center in a frequency distribution that indicates a distribution status of a distance measurement point group, which is a group of the distance measurement points whose positions are sequentially acquired, for each position in the right-left direction of the vehicle;

determining whether estimation of the lateral position of the road boundary is in an unstable state, according to information about a plurality of peaks when the plurality of peaks having a frequency in the frequency distribution equal to or higher than a predetermined value are disposed on one side of a left side and a right side of the vehicle as a center;

acquiring a map data including information about a numerical number of traffic lanes;

specifying a vehicle position of the vehicle on a map according to an acquired map data;

estimating a travel lane of the vehicle based on the information about the numerical number of traffic lanes corresponding to a specified vehicle position and included in an acquired map data, and a position relationship between an estimated lateral position of the road boundary and the vehicle position;

estimating the travel lane of the vehicle without using an estimation result of the lateral position of the road boundary, which is determined to be the unstable state; and sorting the distance measurement points, whose positions are sequentially acquired, into predetermined division units that are prepared by dividing a detection range of the distance measurement sensor, and replaces and combines the distance measurement points for each division unit into one distance measurement point, wherein the lateral position of the road boundary are estimated to be a position in the right-left direction of the vehicle indicated by the most frequent value of each of the right side and the left side of the vehicle as the center in the frequency distribution of the distance measurement point group that is prepared by replacing and combining the distance measurement points sequentially obtained for each division unit into one distance measurement point.

8. A computer readable non-transitory storage medium including instructions executed by a computer, the instructions comprising:

acquiring a position of a distance measurement point detected by a distance measurement sensor that transmits an exploration wave around a vehicle, receives a reflection wave of the exploration wave reflected by an object, and detects the position of the distance measurement point with respect to the vehicle, the position being disposed on a surface of the object at which the exploration wave is reflected;

estimating a lateral position of a road boundary to be a position in a right-left direction of the vehicle indicated by a most frequent value of each of a right side and a left side of the vehicle as a center in a frequency distribution that indicates a distribution status of a distance measurement point group, which is a group of distance measurement points whose positions are sequentially acquired, for each position in the right-left direction of the vehicle;

determining whether estimation of the lateral position of the road boundary is in an unstable state, according to information about a plurality of peaks when the plurality of peaks having a frequency in the frequency distribution equal to or higher than a predetermined value are disposed on one side of a left side and a right side of the vehicle as a center;

acquiring a map data including information about a numerical number of traffic lanes;

specifying a vehicle position of the vehicle on a map according to an acquired map data;

estimating a travel lane of the vehicle based on the information about the numerical number of traffic lanes corresponding to a specified vehicle position and included in an acquired map data, and a position relationship between an estimated lateral position of the road boundary and the vehicle position;

estimating the travel lane of the vehicle without using an estimation result of the lateral position of the road boundary, which is determined to be the unstable state; and sorting the distance measurement points, whose positions are sequentially acquired, into predetermined division units that are prepared by dividing a detection range of the distance measurement sensor, and replaces and combines the distance measurement points for each division unit into one distance measurement point, wherein the lateral position of the road boundary are estimated to be a position in the right-left direction of the vehicle indicated by the most frequent value of each of the right side and the left side of the vehicle as the center in the frequency distribution of the distance measurement point group that is prepared by replacing and combining the distance measurement points sequentially obtained for each division unit into one distance measurement point.

* * * * *